US011343567B1

(12) United States Patent
Regunathan et al.

(10) Patent No.: US 11,343,567 B1
(45) Date of Patent: May 24, 2022

(54) SYSTEMS AND METHODS FOR PROVIDING A QUALITY METRIC FOR MEDIA CONTENT

(71) Applicant: Meta Platforms, Inc., Menlo Park, CA (US)

(72) Inventors: Shankar Lakshmi Regunathan, Redmond, WA (US); Haixiong Wang, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 217 days.

(21) Appl. No.: 16/534,568

(22) Filed: Aug. 7, 2019

(51) Int. Cl.
*H04N 21/4402* (2011.01)
*H04N 21/236* (2011.01)
*H04N 21/442* (2011.01)
*H04N 21/2662* (2011.01)

(52) U.S. Cl.
CPC ... *H04N 21/440218* (2013.01); *H04N 21/236* (2013.01); *H04N 21/2662* (2013.01); *H04N 21/44209* (2013.01)

(58) Field of Classification Search
None
See application file for complete search history.

(56) References Cited

U.S. PATENT DOCUMENTS

| | | | | |
|---|---|---|---|---|
| 8,675,577 | B2* | 3/2014 | Oyman | H04W 28/24 370/329 |
| 9,955,160 | B1* | 4/2018 | Yadav | H04N 19/117 |
| 10,178,140 | B2* | 1/2019 | Reznik | H04L 65/60 |
| 2008/0014883 | A1* | 1/2008 | Topaltzas | H04M 3/2236 455/187.1 |
| 2013/0042015 | A1* | 2/2013 | Begen | H04N 19/46 709/231 |
| 2014/0139733 | A1* | 5/2014 | MacInnis | H04N 19/154 348/441 |
| 2015/0016285 | A1* | 1/2015 | Yuan | H04L 65/00 370/252 |
| 2016/0028647 | A1* | 1/2016 | Ramakrishnan | H04L 67/02 709/226 |

(Continued)

OTHER PUBLICATIONS

Gu et al., "Quality Assessment Considering Viewing Distance and Image Resolution", IEEE Transactions on Broadcasting, Sep. 2015, pp. 1-12.

(Continued)

*Primary Examiner* — Ricky Chin
(74) *Attorney, Agent, or Firm* — FisherBroyles, LLP

(57) ABSTRACT

The disclosed computer-implemented method may include receiving original media content, transcoding the original media content into a plurality of encoded media files, determining an adaptive bit rate for providing a one of the plurality of encoded media files to a computing device, delivering the encoded media file to the computing device at the adaptive bit rate for viewing on a display device of the computing device, and measuring a quality of the displayed encoded media file based on an overall mean opinion score associated with the delivered encoded media file. The overall mean opinion score may be based on a measured playback quality associated with the encoded media file and a measured upload quality associated with the original media content. Various other methods, systems, and computer-readable media are also disclosed.

20 Claims, 14 Drawing Sheets

(56) References Cited

U.S. PATENT DOCUMENTS

| | | | |
|---|---|---|---|
| 2016/0105478 A1* | 4/2016 | Oyman | H04L 65/602 709/217 |
| 2016/0112732 A1* | 4/2016 | Li | H04N 21/2662 725/116 |
| 2016/0189749 A1* | 6/2016 | Rav-Acha | A61B 5/1116 386/278 |
| 2016/0234078 A1* | 8/2016 | Jana | H04L 47/823 |
| 2017/0237983 A1* | 8/2017 | Adsumilli | H04N 21/23439 375/240.03 |
| 2018/0124146 A1* | 5/2018 | Chen | H04N 21/23439 |
| 2018/0190327 A1* | 7/2018 | Coward | H04N 21/21805 |
| 2018/0212859 A1* | 7/2018 | Li | H04L 41/0896 |
| 2019/0158815 A1* | 5/2019 | He | H04N 21/4728 |
| 2019/0327510 A1* | 10/2019 | Kalagi | H04N 21/2662 |
| 2020/0092217 A1* | 3/2020 | Flomen | H04L 29/06523 |
| 2020/0322395 A1* | 10/2020 | Copley | H04L 65/605 |
| 2021/0006614 A1* | 1/2021 | Oyman | H04L 65/4084 |
| 2021/0021806 A1* | 1/2021 | He | H04N 21/44209 |
| 2021/0021849 A1* | 1/2021 | Wang | H04N 19/105 |
| 2021/0067758 A1* | 3/2021 | Choi | G06T 19/00 |
| 2021/0127180 A1* | 4/2021 | Chakraborty | H04N 21/8456 |

OTHER PUBLICATIONS

Lin et al., "Perceptual visual quality metrics: A survey", J. Vis. Commun., 2011, pp. 1-16.

\* cited by examiner

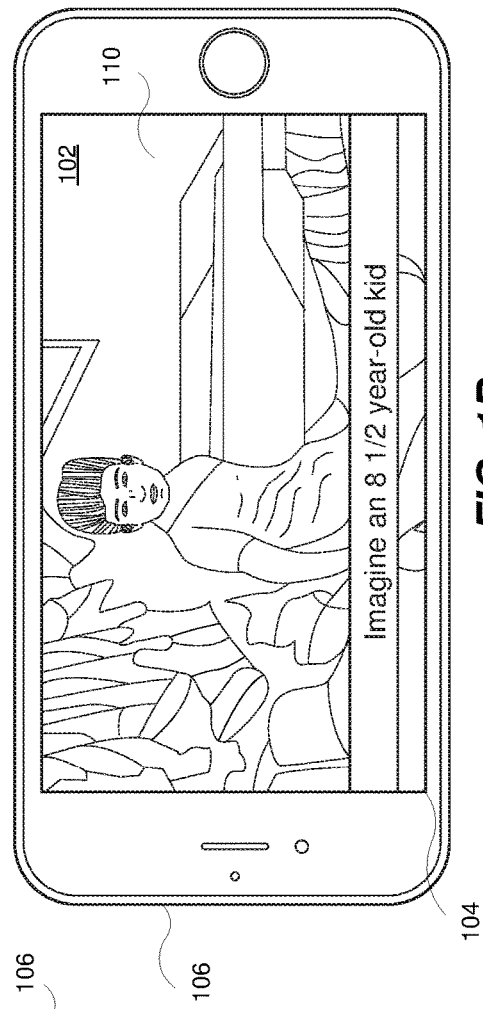
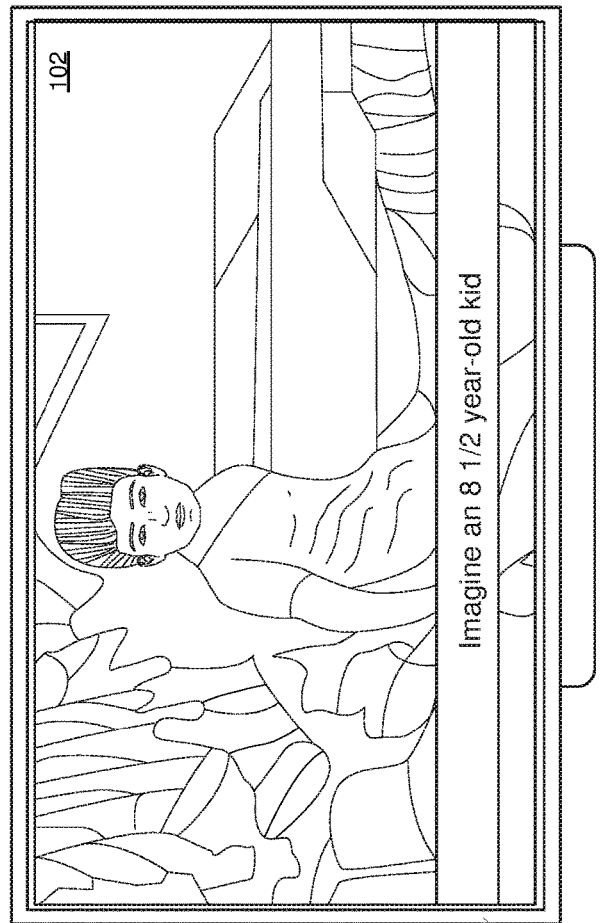
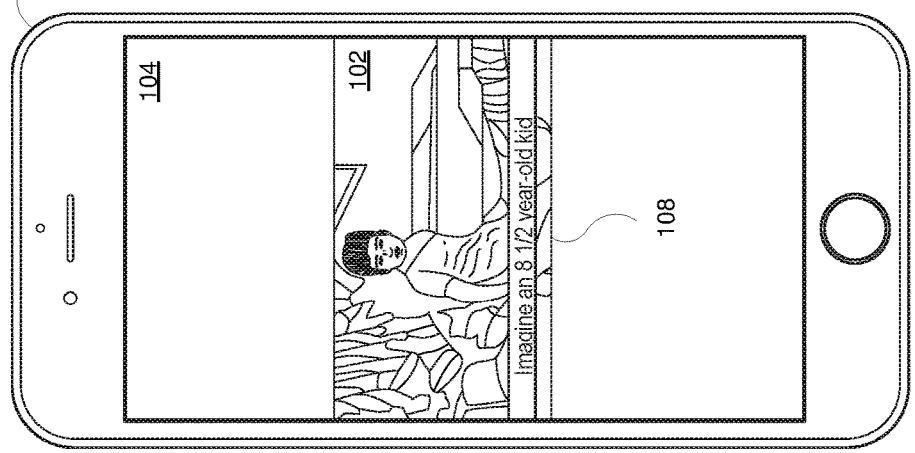

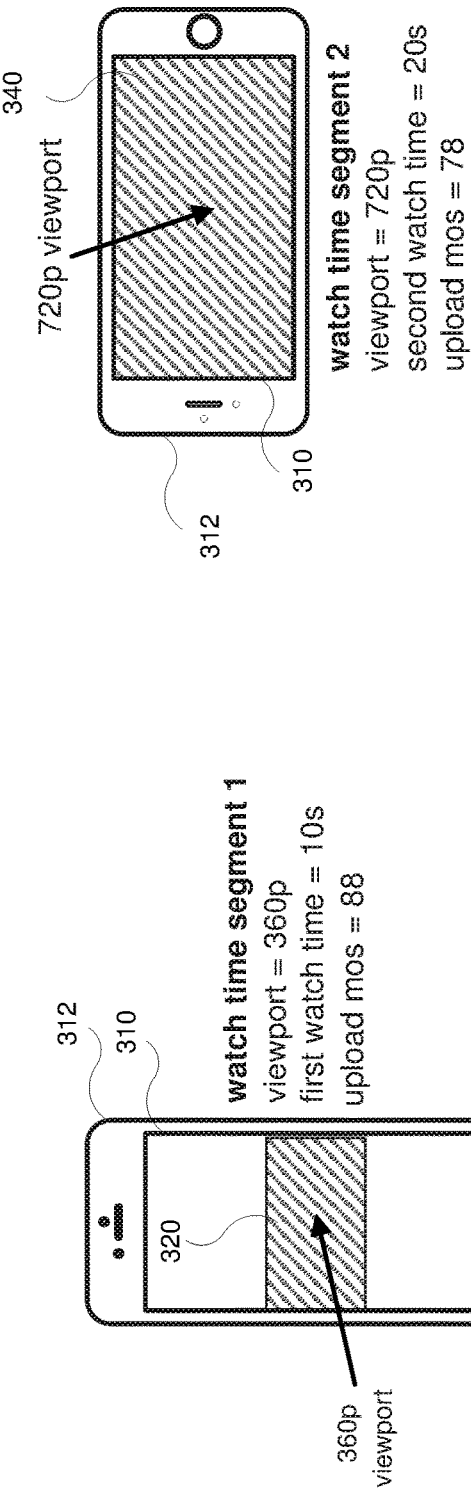

FIG. 5A
| Encoding | Transmission Speed | MOS@360p | MOS@720p |
|---|---|---|---|
| 250 kbps | | 70 | 40 522 |
| 500 kbps | | 90 514 | 60 524 |
| 1.0 mbps | | 95 504 | 85 526 |
| 2.5 mbps | | 98 516 | 95 506 |
| | | 518 | |
502
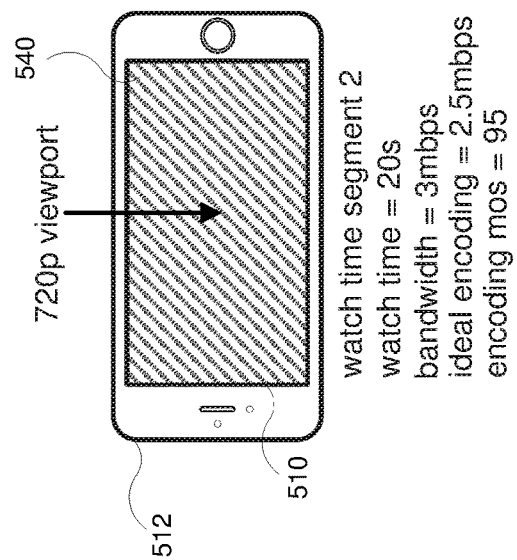
FIG. 5C
720p viewport
watch time segment 2
watch time = 20s
bandwidth = 3mbps
ideal encoding = 2.5mbps
encoding mos = 95
540
512
510
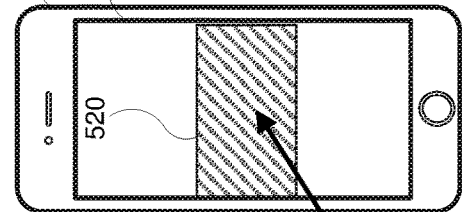
FIG. 5B
512
510
520
360p viewport
watch time segment 1
watch time = 10s
bandwidth = 800kbps
ideal encoding = 500 kbps
encoding mos = 90

SYSTEMS AND METHODS FOR PROVIDING A QUALITY METRIC FOR MEDIA CONTENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1A is a diagram showing media content displayed on a display device of a computing device in an in-feed mode with the computing device orientated in a portrait mode of operation.

FIG. 1B is a diagram showing the media content displayed on a display device of a computing device in a full screen mode with the computing device 106 orientated in a landscape mode of operation.

FIG. 1C is a diagram showing media content displayed on a HDTV.

FIG. 3A is a diagram showing a table showing perceived video quality for media content based on upload resolution of the media content verses a mean opinion score for the media content when the uploaded media content is displayed in a 360p viewport and a 720p viewport.

FIG. 3B is a diagram showing a first segment of the media content as displayed in a 360p viewport for a first watch time.

FIG. 3C is a diagram showing a second segment of the media content as displayed in a 720p viewport for a second watch time.

FIG. 5A is a diagram showing a table showing perceived video quality of media content based on an encoding of the media content when delivered at specific kilobit per second or megabit per second delivery rates at respective encoded resolutions.

FIG. 5B is a diagram showing a first segment of the media content played at 500 kbps in a 360p viewport for a first watch.

FIG. 5C is a diagram showing a second segment of the media content as played at 2.5 mbps in a 720p viewport for a second watch.

Figure 2:
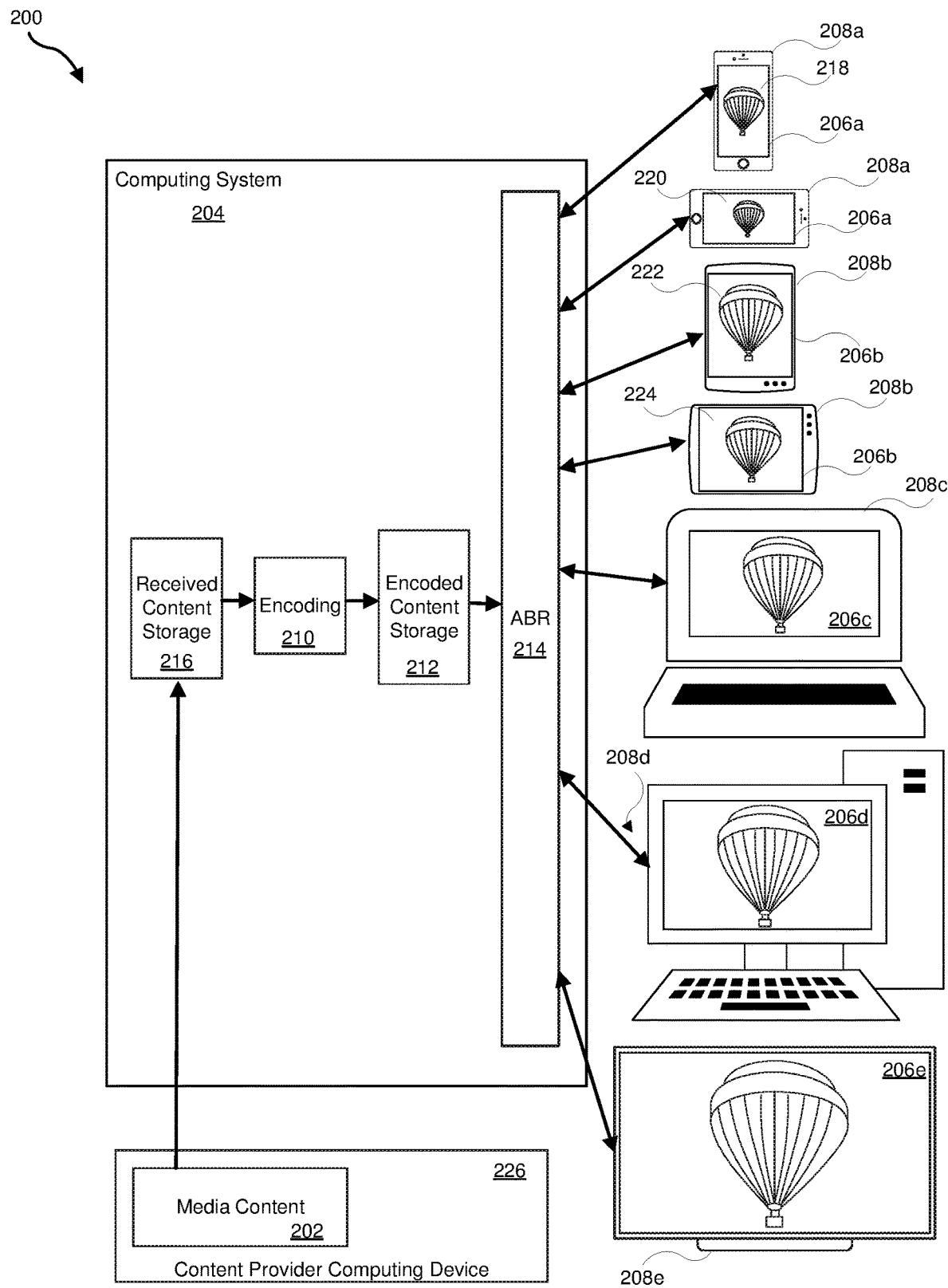
FIG. 2 is a block diagram of an example system for providing media content from a content provider computing device to a computing system that may further provide an encoded version of the media content to one or more playback display devices included in respective playback computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A user may experience a wide variation in a playback experience when viewing the same media content (e.g., when viewing a video or other type of streaming media). A user may view the media content on, for example, a mobile computing device, a television (TV) (e.g., a High Definition Television (HDTV)), or another computing system that includes a display device. For example, the mobile computing device, the TV, and/or the computing system may be connected to (interfaced with) a network (e.g., the internet, a cellular network, etc.). The user may view the media content as it is streamed (sent to) the viewing device. The user viewing experience may vary dependent on the communication connection and speed of providing the streaming media to the viewing device. In addition, or in the alternative, a size and/or resolution of the display of the viewing device may contribute to the user viewing experience. In addition, or in the alternative, whether the user is viewing the media content as in-feed or full screen on the viewing device may also affect the viewing experience. A user perceived quality of media content of the same encoding, therefore, may be different based on at least the above described viewing experiences of the user making the measuring of the perceived quality of the media content as viewed by a user challenging.

The present disclosure is generally directed to systems and methods for providing a quality metric for media content as perceived by users that considers the viewing experience of the user. As will be explained in greater detail below, embodiments of the present disclosure may assign a mean opinion score to a media content (e.g., a media file, streaming media content, a streaming video, a video, an image, digital media, etc.) that may be used as an objective metric to predict a user perceived quality for the media content.

As described herein, media content, which may also be referred to as digital content or digital media may be provided to a user in many formats that may include, but are not limited to, audio and video files, graphic files, animation files, and image files. In some examples, media content (digital content or digital media) may include information available for download to a computing device for later viewing by a user. In some examples, media content (digital content or digital media) may include information available for immediate viewing by a user that may be streamed to the computing device of the user and provided on a display device of the computing device.

User perceived quality of media content may involve many criteria. For example, the criteria may include, but are not limited to, a pixel quality of the media content, stalls and/or delays in the playback of the media content, audio-to-visual video content synchronization, audio quality of the video, and content type. In addition, a user may view the same media content on many different types of display devices of varying resolution. For example, an HDTV may display video images of the media content at a four kilobyte (4K) pixel resolution. In another example, a mobile device (e.g., a smartphone) may display video images of the same media content at a resolution that is lower (less than) the resolution of the HDTV (e.g., 360×640 pixels). In addition, or in the alternative, a user may view the media content an in-feed mode or a full screen mode.

In addition, or in the alternative, a user may view the same media content a display device at different orientations. For example, a user may view the entire media content with the display device orientated in a portrait mode. For example, a user may view the entire media content with the display device orientated in a landscape mode. For example, a user may view a portion of the media content (e.g., a first segment of the media content) in a portrait mode and may view another portion of the media content (e.g., a second segment of the media content) in a landscape mode.

A mean opinion score (MOS) of the quality of media content as perceived by a user may be an objective metric for use in predicting a user perceived quality for media content. For example, a video may be assigned a MOS. The MOS may be a score from zero to one hundred, zero being a perceived low quality for the video and one hundred being a perceived high quality for the video. A MOS may be assigned to different components of the media content. An upload MOS may be a mean opinion score related to the quality of the media content as perceived by the user that is associated with the upload resolution or size of the media content. A playback MOS may be a mean opinion score related to the quality of the media content as perceived by the user that is associated with the playback of the media content on a computing device of the user. An encoding MOS may be a mean opinion score related to the quality of the media content as perceived by the user that is associated with the encoding of the media content (e.g., file type, encoding method, etc.).

The upload MOS, the playback MOS, and the encoding MOS may be used to determine an overall MOS. The overall MOS may be reflective of the display device used to view the video (e.g., the screen size of the device, the resolution of the display device), and the orientation of the media content as displayed on the display device (e.g., whether the media content is displayed on the display device while it is in a portrait orientation or a landscape orientation), and the viewing mode of the media content (e.g., whether the media content is displayed in a full screen or in-feed mode on the display device). Each component of the overall MOS may be used to determine one or more reasons for the overall MOS. For example, a reason for a low overall MOS may be dependent on a low upload MOS.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1A is a diagram showing media content 102 displayed on a display device 104 of a computing device 106 in an in-feed mode 108 with the computing device 106 orientated in a portrait mode of operation.

FIG. 1B is a diagram showing the media content 102 displayed on the display device 104 of the computing device 106 in a full screen mode 110 with the computing device 106 orientated in a landscape mode of operation.

FIG. 1C is a diagram showing media content 102 displayed on a HDTV 112.

As shown in FIGS. 1A-C, the same media content may be viewed on different display devices, in different modes, and in different orientations of the display devices. As described in further detail herein, an overall mean opinion score may be associated with the media content that may be associated with the viewing device and that may be based on a user perceived viewing quality.

As shown in FIGS. 1A-C, the same media content may be viewed on different display devices, in different modes, and in different orientations of the display devices. As described in further detail herein, an overall mean opinion score may be associated with the media content that may be associated with the viewing device and that may be based on a user perceived viewing quality. A perceived viewing quality of the media content may be dependent on many criteria that may include, but are not limited to, a resolution of a display device, a mode of display (a playback mode) of the display device (e.g., in-feed verses full screen, e.g., portrait verses landscape), the quality of the received original media content, an encoding of original media content, a delivery method of the media content (e.g., live streaming verses download and viewed off-line), a speed of delivery of the media content to the display device (e.g., are there any visible stalls or delays in the updating of the media content on the display device.

As described herein, resolution of media content may be represented as video resolution where "p" stands for progressive scanned (i.e., non-interlaced). For example, a number before the "p" may represent a number of vertical pixels in the media content. A number of horizontal pixels may be determined to provide media content at particular aspect ratios (e.g., 3:2, 4:3, 16:9, 5:3, 15:10, 18:10, etc.). Though examples are provided herein, the concepts described may be applied to media content at all resolutions.

For example, 240p may have a resolution of 320 pixels horizontally by 240 pixels vertically to provide media content at a 4:3 aspect ratio. For example, 240p may have a resolution of 428 pixels horizontally by 240 pixels vertically to provide media content at a 16:9 aspect ratio. For example, 360p may have a resolution of 480 pixels horizontally by 360 pixels vertically to provide media content at a 4:3 aspect ratio.

For example, 480p may have a resolution of 640 pixels horizontally by 480 pixels vertically to provide media content at a 4:3 aspect ratio. For example, 480p may have a resolution of 854 pixels horizontally by 480 pixels vertically to provide media content at a 16:9 aspect ratio. For example, 480p may have a resolution of 720 pixels horizontally by 480 pixels vertically to provide media content at a 3:2 aspect ratio.

For example, 720p may have a resolution of 1280 pixels horizontally by 720 pixels vertically to provide media content at a 16:9 aspect ratio. For example, 1080p may have a resolution of 1920 pixels horizontally by 1080 pixels vertically to provide media content at a 16:9 aspect ratio. For example, 4K may have a resolution of 3840 pixels horizontally by 2160 pixels vertically to provide media content at a 16:9 aspect ratio.

FIG. 2 is a block diagram of an example system 200 for providing (delivering) media content 202 from a content provider computing device 226 to a computing system 204 that may further provide an encoded version of the media content to one or more playback display devices 206a-e included in respective playback computing devices 208a-e. The media content 202 may be stored in a received content storage repository 216. In some implementations, the media content 202 may be an encoded or transcoded version of original media content as captured, obtained, generated, and/or created by the content provider computing device 226. The encoding and/or transcoding may be performed on the original media content to compress the data in the original media content for improved transmission from the content provider computing device 226 to the computing system 204. In some implementations, the received media content may be the original media content.

An encoding module 210 may encode received content stored in the received content storage repository 216 into one or more progressive scanned encodings (as described, for example, with reference to FIGS. 1A-C) for storage in the encoded content storage repository 212. An adaptive bitrate module 214 may interface with one or more of the playback computing devices 208a-e to determine which progressive scanned encoding of the media content to provide to the respective playback display devices 206a-e based on one or more criteria that may include, but is not limited to, a display resolution of the respective playback display device 206a-e, an orientation of the respective playback display device 206a-e, a viewing mode of the media content, and a communication speed between the computing system 204 and the respective playback computing device 208a-e.

For example, the computing device 208a may be a smartphone, personal digital assistant (PDA), or other type of mobile computing device. Media content may be viewed (displayed) in a portrait orientation or mode of operation (e.g., portrait mode 218) or a landscape orientation or mode of operation (e.g., landscape mode 220). For example, the computing device 208b may be a tablet computing device. Media content may be viewed (displayed) in a portrait orientation or mode of operation (e.g., portrait mode 222) or a landscape orientation or mode of operation (e.g., landscape mode 224). For example, the computing device 208c may be a laptop computing device. For example, the computing device 208d may be a desktop computing device. For example, the computing device 208e may be an HDTV.

As shown in FIG. 2, the same media content (e.g., a picture (image, video) of a hot air balloon) may be displayed on each playback display device 206a-e. A quality of the received media content may influence a playback quality of the displayed encoded media content. For example, dependent on the size, resolution, and orientation of the playback display device 206a-e, a playback quality of the displayed encoded media content may vary as will be described further herein. For example, the same media content may be displayed on the display device 206a of the computing device 208a in an in-feed portrait mode 218 and a full screen landscape mode 220. In some cases, a playback quality of the media content may be perceived as lower quality when displayed in the full screen landscape mode 220 as compared to the in-feed portrait mode 218 if the quality (resolution) of the encoded media content provided to the computing device 208a in each orientation was received at a resolution such that the in-feed mode 218 provides a sharper image than the full screen mode 220. For example, displaying encoded media content that was received at a resolution that is much lower (less than) a resolution of the display device 206e of the computing device 208e (e.g., a 4K HDTV) may result in a perceived low quality for the viewing of the media content on the display device 206e.

FIGS. 3A-C, FIGS. 4A-C, and FIGS. 5A-C show mean opinion scores for perceived image quality for example media content with a thirty second watch time that includes a first segment with a ten second watch time and a second segment with a twenty second watch time. The first segment may be viewed in an in-feed mode on a display device of a computing device orientated in a portrait mode of operation. The first segment may be delivered in a first encoded format. The second segment may be viewed in a full screen mode on a display device of a computing device orientated in a landscape mode of operation. The second segment may be delivered in a second encoded format.

FIG. 3A is a diagram showing a table 302 showing perceived video quality (PVQ) for media content (e.g., a video) based on upload resolution of the media content verses a mean opinion score (MOS) for the media content when the uploaded media content is displayed in a 360p viewport 320 as shown in FIG. 3B and a 720p viewport 340 as shown in FIG. 3C.

FIG. 3B is a diagram showing a first segment of the media content as displayed in the 360p viewport 320 for a first watch time (e.g., ten seconds of a thirty second total watch time for the media content). For example, the first segment may be viewed in an in-feed mode on a display device 310 of a computing device 312 orientated in a portrait mode of operation. The first segment may be delivered in a first encoded format (e.g., 360p).

FIG. 3C is a diagram showing a second segment of the media content as displayed in the 720p viewport 340 for a second watch time (e.g., twenty seconds of a thirty second total watch time for the media content). The second segment may be viewed in a full screen mode on the display device 310 of the computing device 312 orientated in a landscape mode of operation. The second segment may be delivered in a second encoded format (e.g., 720p).

Referring to FIG. 3A, a mean opinion score 304 may be associated with delivery of the media content at an encoded 360p format for viewing in an in-feed mode in the 360p viewport 320 as shown in FIG. 3B. Referring to FIG. 3A, a mean opinion score 306 may be associated with delivery of the media content at an encoded 720p format for viewing in a full screen mode in the 720p viewport 340 as shown in FIG. 3C.

In general, a mean opinion score may be a score (a number) between and including zero and 100. A mean opinion score may be applied to (associated with) various aspects of media content from upload to delivery. An upload quality for media content may be determined based on a given watch time and viewport distribution independent of quality associated with the encoding of the received media content and independent of quality associated with the viewing of a playback of the media content.

An upload mean opinion score may be determined (calculated) as a time weighted average of an upload mean opinion score associated with the viewing of the first segment of the media content and an upload mean opinion score associated with the viewing of the second segment of the media content. The upload media score for the media content may reflect a user switching viewing orientations while viewing the media content. The upload mean opinion score may guide for improvements to uploaded media content.

Expression 1 is an example expression for calculating a time weighted average for an upload mean opinion score for media content.

$$\text{Upload } MOS = \frac{(t_{S1} * U_{MOS_{S1}}) + (t_{S2} + U_{MOS_{S2}})}{t_{S1} + t_{S2}} \quad (1)$$

where $t_{S1}$ is a watch time (e.g., in seconds) for a first segment of the media content, $U_{MOS_{S1}}$ is an upload mean opinion score for the first segment, $t_{S2}$ is a watch time (e.g., in seconds) for a second segment of the media content, and $U_{MOS_{S2}}$ is an upload mean opinion score for the second segment.

Expression 2 is an example expression for calculating a time weighted average for an upload mean opinion score loss. As described, a mean opinion score may be a value between (and including) zero to 100, where 100 may be considered a best or prefect score. The uploaded mean opinion score loss is a value for the upload mean opinion score that may be subtracted from 100, providing a mean opinion score loss as compared to an ideal, best, or perfect upload mean opinion score for media content.

Upload MOS Loss=100−Expression 1 (2)

Expression 3 is an example expression for calculating an upload mean opinion score for media content as shown in the example of FIGS. 3A-C.

$$\text{Upload } MOS = \frac{(10 * 88) + (20 * 78)}{10 + 20} = 81.3 \quad (3)$$

Expression 4 is an example expression for calculating an upload mean opinion score loss for media content as shown in the example of FIGS. 3A-C.

Upload MOS Loss=100−Expression 3=18.7 (4)

Referring to FIG. 2, a quality (e.g., a mean opinion score) associated with uploaded media content (e.g., a quality associated with media content 202 provided by a content provider computing device 226 to the computing system 204) may widely vary dependent on one or more of an original source of the media content, any transcoding or compression applied to the media content before the media content is provided for viewing, a speed of a communication connection (e.g., an upload speed) between the content provider computing device 226 and the computer system 204, and a quality of a communication connection (e.g., stalls or drop outs) between the content provider computing device 226 and the computer system 204. Media content uploaded from the content provider computing device 226 to the computing system 204 may be a compressed and lower resolution (e.g., reduced quality) version of original media content generated, created, and/or obtained by the content provider computing device 226. An upload mean opinion score may apply a quality score to the media content reflective of the upload quality of the media content 202 provided by the content provider computing device 226 to the computer system 204. For example, this may allow for the quality effect of compression and/or transcoding of original media content to be applied to (associated with, measured at) input to the computing system 204.

An upload mean opinion score may be based on one or more parameters of uploaded media content such as bitrate, resolution, and complexity. An upload mean opinion score may be dependent on a quality of the original media content (before any compression, transcoding, or transmission from a content provider computing device to a computing system). For example, the higher the quality of the original media content the higher the upload mean opinion score for the received media content.

In addition, or in the alternative, an upload mean opinion score may be dependent on a compression level of the media content provided by the content provider computing device to the computing system. For example, the more compressed the media content the lower the upload mean opinion score.

In addition, or in the alternative, an upload mean opinion score may be dependent on an overall size (e.g., file size) of the media content provided by the content provider computing device to the computing system. For example, in some cases, a larger file size may indicate a higher quality media content provided to the computing system which may result in a higher upload mean opinion score.

In addition, or in the alternative, an upload mean opinion score may be dependent on the communication connection between the content provider computing device and the computing system. For example, a WiFi connection between the content provider computing device and the computing system may allow for a speed and quality of transmission between the content provider computing device and the computing system (e.g., the communication connection between the content provider computing device and the computing system may not be bandwidth limited) that allows for uploading of larger media content files (e.g., uploading of the original media content files, uploading of media content files that may not require any transcoding or compression) from the content provider computing device and the computing system, therefore resulting in higher quality uploaded media content. For example, a cellular network connection between the content provider computing device and the computing system may impact the speed and/or quality of transmission between the content provider computing device and the computing system (e.g., the communication connection between the content provider computing device and the computing system may be bandwidth limited). This may necessitate increased transcoding or compression of the uploaded media data, therefore resulting in lower quality uploaded media content.

For example, a size of a media content file for transmitting from a content provider computing device to a computing system may be determined based on what may be considered a reasonable amount of time to wait for the upload of the media content. For example, the amount of time for the upload of a media content file may be dependent on one or more of the content provider computing device, the computing system, the communication connection between the content provider computing device and the computing system. As such, an amount of transcoding and/or compression may be determined based on what may be considered a reasonable amount of time to wait for the upload of the media content.

Figures 4A, 4B, 4C:
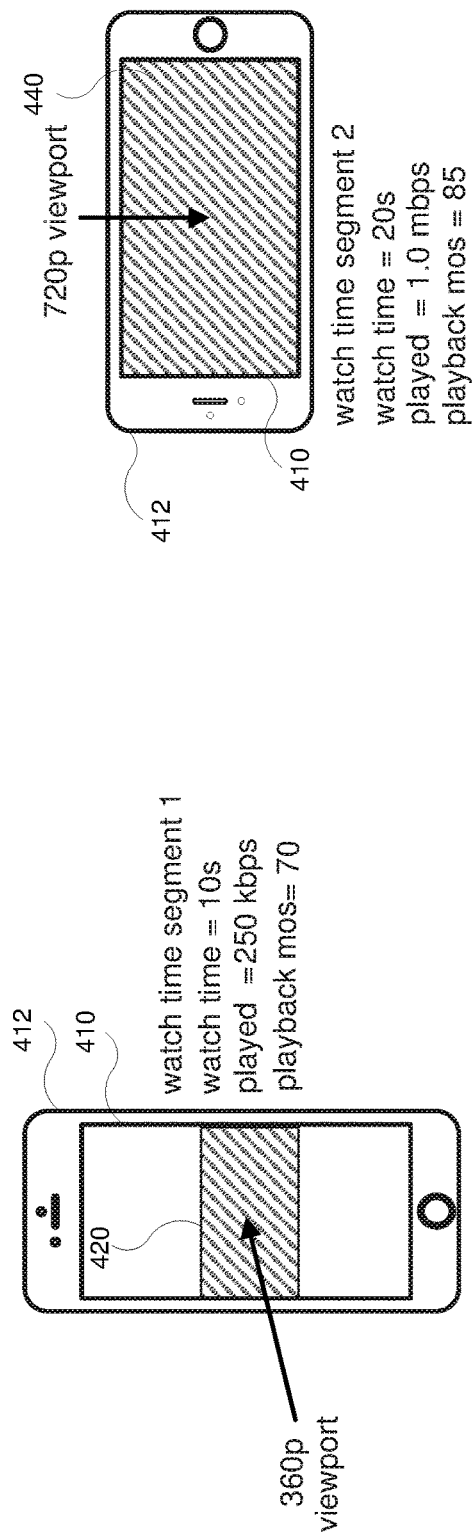
FIG. 4A is a diagram showing a table showing perceived video quality of media content based on playback of the media content at specific kilobit per second (kbps) or megabit per second (mbps) delivery rates at respective encoded resolutions.
FIG. 4B is a diagram showing a first segment of the media content played at 250 kbps in a 360p viewport for a first watch time.
FIG. 4C is a diagram showing a second segment of the media content as played at 1.0 mbps in a 720p viewport for a second watch time.

FIG. 4A is a diagram showing a table 402 showing perceived video quality (PVQ) of media content (e.g., a video) based on playback of the media content at specific kilobit per second (kbps) or megabit per second (mbps) delivery rates at respective encoded resolutions. In the example table 402, a mean opinion score (MOS) 404 is associated with media content when the media content is played (delivered) at 250 kbps in a 360p viewport as shown in FIG. 4B. In the example table 402, a mean opinion score (MOS) 406 is associated with media content when the media content is played (delivered) at 1.0 mbps in a 720p viewport as shown in FIG. 4C.

FIG. 4B is a diagram showing a first segment of the media content played (delivered) at 250 kbps in a 360p viewport 420 for a first watch time (e.g., ten seconds of a thirty second total watch time for the media content). For example, the first segment may be viewed in an in-feed mode on a display device 410 of a computing device 412 orientated in a portrait mode of operation. The first segment may be delivered in a first encoded format (e.g., 360p) at a first transmission speed (e.g., 250 kbps).

FIG. 4C is a diagram showing a second segment of the media content as played (delivered) at 1.0 mbps in a 720p viewport 440 for a second watch time (e.g., twenty seconds of a thirty second total watch time for the media content). For example, the second segment may be viewed in a full screen mode on a display device 410 of a computing device 412 orientated in a landscape mode of operation. The second segment may be delivered in a second encoded format (e.g., 720p) at a second transmission speed (e.g., 1.0 mbps).

Referring to FIG. 4A, the mean opinion score 404 may be associated with delivery of the media content at 250 kbps for viewing in an in-feed mode in the 360p viewport 420 as shown in FIG. 4B. Referring to FIG. 4A, the mean opinion score 406 may be associated with delivery of the media content at 1.0 mbps for viewing in a full screen mode in the 720p viewport 440 as shown in FIG. 4C.

Referring to FIG. 2 and FIGS. 4A-C, in some implementations, the computing device 412 may be the computing device 208a. In some implementations, the computing device 412 may be the computing device 208b. The computing system 204 may determine (select) an encoded media content file for providing to the computing device 412. In addition, or in the alternative, the computing system 204 may determine an adaptive bit rate for transmitting (e.g., providing, delivering, streaming) the selected encoded media content file from the encoded content storage repository 212 to the computing device 412 based on one or more criteria of the computing device 412. The criteria of the computing device 412 may include, but is not limited to, a resolution of the display device 410, an orientation of the computing device 412, a communication connection between the computing system 204 and the computing device 412, and a transmission speed and/or quality of the communication connection between the computing device 412 and the computing system 204.

The computing system (e.g., the computing system 204) may use an adaptive bitrate module (e.g., the adaptive bitrate module 214) to determine an optimum (e.g., ideal, best, preferred) transmission delivery rate (e.g., bits per second) to determine the encoded media content for delivery and/or to determine a transmission speed (a delivery speed, a transmission rate) for providing the encoded media content from the computing system (e.g., the computing system 204) to the computing device 412.

Referring to table 402, a mean opinion score 414 may be associated with delivery of the encoded media content at 1.0 mbps for viewing in an in-feed mode in a 360p viewport. Though the mean opinion score 414 for delivery of the 360p viewport encoded media content at 1.0 mbps may be higher than the mean opinion score 404 for delivery of the 360p viewport encoded media content at 250 kbps, in some implementations, a computing system (e.g., the computing system 204) may be unable to deliver the encoded media content file for the 360p viewport at the higher 1.0 mbps bitrate. A mean opinion score 416 may be associated with delivery of the encoded media content at 250 kbps for viewing in a full screen mode in a 720p viewport. In some implementations, a computing system (e.g., the computing system 204) may be able to deliver the encoded media content file for the 720p viewport at a higher bit rate (e.g., 1.0 mbps bitrate) that is associated with a higher mean opinion score (e.g., the mean opinion score 406).

In general, a computing system may determine a maximum optimal bit rate for delivery of encoded media content to a computing device based on a communication connection between the computing system and the computing device and based on a mean opinion score associated with the transmitting (delivery, providing, playing) of the encoded media content. The maximum optimal bit rate may be determined based on a best (highest) mean opinion score for the playback of the encoded media content on the computing device. A playback quality for media content may be determined based on a speed of delivery (playing or transmission), a watch time, and a viewport independent of quality associated with the encoding of the received media content and independent of quality associated with the uploading of the media content.

Expression 5 is an example expression for calculating a time weighted average for a playback mean opinion score for media content.

$$\text{Playback } MOS = \frac{(t_{S1} * P_{MOS_{S1}}) + (t_{S2} + P_{MOS_{S2}})}{t_{S1} + t_{S2}} \quad (5)$$

where $t_{S1}$ is a watch time (e.g., in seconds) for a first segment of the media content, $P_{MOS_{S1}}$ is a playback mean opinion score for the first segment, $t_{S2}$ is a watch time (e.g., in seconds) for a second segment of the media content, and $P_{MOS_{S2}}$ is a playback mean opinion score for the second segment.

Expression 6 is an example expression for calculating a time weighted average for a playback mean opinion score loss. As described, a mean opinion score may be a value between (and including) zero to 100, where 100 may be considered a best or prefect score. The playback mean opinion score loss is a value for the playback mean opinion score that may be subtracted from 100, providing a mean opinion score loss as compared to an ideal, best, or perfect playback mean opinion score for media content.

Playback MOS Loss=100−Expression 5 (6)

Expression 7 is an example expression for calculating a playback mean opinion score for media content as shown in the example of FIGS. 4A-C.

$$\text{Playback } MOS = \frac{(10*70)+(20*85)}{10+20} = 80.0 \quad (7)$$

Expression 8 is an example expression for calculating a playback mean opinion score loss for media content as shown in the example of FIGS. 4A-C.

$$\text{Playback MOS Loss}=100-\text{Expression } 7=18.7 \quad (8)$$

As described, a playback mean opinion score may be used to guide an adaptive bit rate playback providing adaptive bitrate selection improvements. In some cases, a playback mean opinion score loss may be reflective of a loss of quality between the original uploaded media content and the delivered encoded media content based on the adaptive bitrate selected for delivery of the encoded media content. For example, original uploaded media content received by a computing system and from a content provider computing device at a 4K resolution may be provided for delivery to a computing device at an encoding of 240p. The providing of the media content to the computing device at a resolution lower than the received resolution may be dependent on one or more criteria of the computing device such as the communication connection and playback bandwidth between the computing system and the computing device. A playback mean opinion score may measure a difference in quality between the original media content provided to the computing system and the encoded media content delivered by the computing system.

FIG. 5A is a diagram showing a table 502 showing perceived video quality (PVQ) of media content (e.g., a video) based on an encoding of the media content when delivered at specific kilobit per second (kbps) or megabit per second (mbps) delivery rates at respective encoded resolutions. In the example table 502, a mean opinion score (MOS) 504 is associated with encoded media content when the encoded media content is played (delivered) at 500 kbps in a 360p viewport as shown in FIG. 5B. In the example table 502, a mean opinion score (MOS) 506 is associated with encoded media content when the encoded media content is played (delivered) at 2.5 mbps in a 720p viewport as shown in FIG. 5C.

FIG. 5B is a diagram showing a first segment of the media content played (delivered) at 500 kbps in a 360p viewport 520 for a first watch time (e.g., ten seconds of a thirty second total watch time for the media content). For example, the first segment may be viewed in an in-feed mode on a display device 510 of a computing device 512 orientated in a portrait mode of operation. The first segment may be delivered in a first encoded format (e.g., 360p) at a first transmission speed (e.g., 500 kbps).

FIG. 5C is a diagram showing a second segment of the media content as played (delivered) at 2.5 mbps in a 720p viewport 540 for a second watch time (e.g., twenty seconds of a thirty second total watch time for the media content). For example, the second segment may be viewed in a full screen mode on a display device 510 of a computing device 512 orientated in a landscape mode of operation. The second segment may be delivered in a second encoded format (e.g., 720p) at a second transmission speed (e.g., 2.5 mbps).

Referring to FIG. 5A, the mean opinion score 504 may be associated with delivery of the media content at 500 kbps for viewing in an in-feed mode in the 360p viewport 520 as shown in FIG. 5B. Referring to FIG. 5A, the mean opinion score 506 may be associated with delivery of the media content at 2.5 mbps for viewing in a full screen mode in the 720p viewport 540 as shown in FIG. 5C.

Referring to FIG. 2 and FIGS. 5A-C, in some implementations, the computing device 512 may be the computing device 208a. In some implementations, the computing device 512 may be the computing device 208b. The computing system 204 may determine (select) an encoded media content file for providing to the computing device 512. In addition, or in the alternative, the computing system 204 may determine an adaptive bit rate for transmitting (e.g., providing, delivering, streaming) the selected encoded media content file from the encoded content storage repository 212 to the computing device 512 based on a bandwidth of the transmission speed of the communication connection between the computing device 512 and the computing system 204 as compared to an ideal communication bandwidth associated with the encoded media content.

In general, an adaptive bitrate module (e.g., the adaptive bitrate module 214) may determine (measure) an encoding quality of encoded media content associated with a viewport based on a watch time and a transmission bandwidth for the delivered encoded media content as compared to an ideal transmission bandwidth for the encoded media content. The adaptive bitrate module (e.g., the adaptive bitrate module 214) may determine (measure) the encoding quality of encoded media content associated with the viewport independent of the quality of the viewed playback of the encoded media content and independent of the quality of the received original uploaded media content.

Referring to table 502, for example, a mean opinion score 514, a mean opinion score 516, and a mean opinion score 518 may be associated with delivery of the encoded media content for viewing in a 360p viewport at 250 kbps, 1.0 mbps, and 2.5 mbps, respectively. Referring to FIG. 2 and FIG. 5B, an adaptive bitrate module (e.g., the adaptive bitrate module 214) may determine a bandwidth of a communication connection between a computing system (e.g., the computing system 204) and a computing device (e.g., the computing device 512). The adaptive bitrate module 214 may identify an optimum (preferred, ideal) delivery of the encoded media content for viewing in a 360p viewport based on the bandwidth of the communication connection. Referring to FIG. 5B, the adaptive bitrate module 214 may determine that the bandwidth of the communication connection between the computing system 204 and the computing device 512 is approximately 800 kbps. The adaptive bitrate module 214 may access the encoded content storage repository 212 and determine that the encoded media content for the 360p viewport be delivered at 500 kbps from the computing system 204 to the computing device 512. Though delivery of the encoded media content for the 360p viewport at higher bit rates may result in higher mean opinion scores, a bandwidth of the communication connection between the computing system 204 and the computing device 512 may not be capable of supporting the higher bitrate communications. The mean opinion score 504, therefore, may be considered a measure of the quality of the adaptive bitrate encoding of the received media content when delivered to a 360p viewport.

Referring to table 502, for example, a mean opinion score 522, a mean opinion score 524, and a mean opinion score 526 may be associated with delivery of the encoded media content for viewing in a 720p viewport at 250 kbps, 500 kbps, and 1.0 mbps, respectively. Referring to FIG. 2 and FIG. 5C, an adaptive bitrate module (e.g., the adaptive bitrate module 214) may determine a bandwidth of a communication connection between a computing system (e.g., the computing system 204) and a computing device (e.g., the computing device 512). The adaptive bitrate module 214 may identify an optimum (preferred, ideal) delivery of the encoded media content for viewing in a 720p viewport based on the bandwidth of the communication connection. Referring to FIG. 5c, the adaptive bitrate module 214 may determine that the bandwidth of the communication connection between the computing system 204 and the computing device 512 is approximately 3.0 mbps. The adaptive bitrate module 214 may access the encoded content storage repository 212 and determine that the encoded media content for the 720p viewport be delivered at 2.5 mbps from the computing system 204 to the computing device 512. The mean opinion score 506, therefore, may be considered a measure of the quality of the adaptive bitrate encoding of the received media content when delivered to a 720 viewport. The adaptive bitrate module 214 may provide the best user viewing experience under given viewing circumstances.

Expression 9 is an example expression for calculating a time weighted average for an encoding mean opinion score for media content.

$$\text{Encoding } MOS = \frac{(t_{S1} * E_{MOS_{S1}}) + (t_{S2} + E_{MOS_{S2}})}{t_{S1} + t_{S2}} \quad (9)$$

where $t_{S1}$ is a watch time (e.g., in seconds) for a first segment of the media content, $E_{MOS_{Si}}$ is an encoding mean opinion score for the first segment, $t_{S2}$ is a watch time (e.g., in seconds) for a second segment of the media content, and $E_{MOS_{S2}}$ is an encoding mean opinion score for the second segment.

Expression 10 is an example expression for calculating a time weighted average for an encoding mean opinion score loss. As described, a mean opinion score may be a value between (and including) zero to 100, where 100 may be considered a best or prefect score. The encoding mean opinion score loss is a value for the encoding mean opinion score that may be subtracted from 100, providing a mean opinion score loss as compared to an ideal, best, or perfect encoding mean opinion score for media content.

Encoding MOS Loss=100−Expression 9 (10)

Expression 11 is an example expression for calculating an encoding mean opinion score for media content as shown in the example of FIGS. 5A-C.

$$\text{Encoding } MOS = \frac{(10*90) + (20*95)}{10 + 20} = 93.3 \quad (11)$$

Expression 12 is an example expression for calculating an encoding mean opinion score loss for media content as shown in the example of FIGS. 5A-C.

Encoding MOS Loss=100−Expression 11=6.7 (12)

In some implementations, an encoding mean opinion score may be considered a measurement of media quality lost in encoding the original uploaded received media content into encoded media content for delivery to particular viewports because a delivery speed (a transmission speed) of the delivery of the encoded media content from a computing system to a computing device may be considered ideal or optimized based on the use of an adaptive bitrate module for determining an ideal transmission speed for providing the encoded media content from the computing system to the computing device. For example, encoding mean opinion scores may be used to identify improvements in compression technology for the encoding of the original received media content. The use of adaptive bitrates and encoding mean opinion scores may allow a computing system to provide the highest quality media content to a computing device based on one or more of a network bandwidth of the communication connection between the computing system and the computing device, a display bandwidth of a display device of the computing device, a display resolution of the display device of the computing device, and an orientation of the computing device when the media content is being display and viewed on the display device of the computing device.

In some implementations, an encoding mean opinion score may be considered a deeper level of a playback mean opinion score because the encoding mean opinion score may be determined (calculated) when the computing system (e.g., the encoding module 210 of the computing system 204) encodes the original uploaded media content. The encoding module 210 may encode the original uploaded media content and store the encoded media content in the encoded content storage repository 212 before a computing device may request to obtain the media content for viewing. In contrast, the playback mean opinion score may be determined (calculated) at the playback time for the media content (e.g., when the media content is being played and viewed on a display device of the computing device that requested and obtained the media content.

In some implementations, an overall mean opinion score may be a combination of the upload mean opinion score and the playback mean opinion score which is measured at the time of playback of the media content.

Expression 13 is an example expression for calculating an overall mean opinion score for media content. The overall mean opinion score is an average of the upload mean opinion score and the playback mean opinion score.

$$\text{Overall } MOS = \frac{\text{Upload } MOS + \text{Playback } MOS}{2} \quad (13)$$

Expression 14 is an example expression for calculating an overall mean opinion score for media content as shown in the example of FIGS. 3A-C, FIGS. 4A-C, and FIGS. 5A-C.

$$\text{Overall } MOS = \left( \frac{(t_{S1} * U_{MOS_{S1}}) + (t_{S2} + U_{MOS_{S2}})}{t_{S1} + t_{S2}} + \frac{(t_{S1} * P_{MOS_{S1}}) + (t_{S2} + P_{MOS_{S2}})}{t_{S1} + t_{S2}} \right) \div 2 \quad (14)$$

Expression 15 is an example expression for calculating an overall mean opinion score for media content as shown in the example of FIGS. 3A-C, FIGS. 4A-C, and FIGS. 5A-C using the numerical values for the upload mean opinion score and the playback mean opinion score.

Overall MOS=(81.3+80)÷2=80.65 (15)

The overall mean opinion score may be an objective metric that predicts user perceived quality for viewed media content based on mean opinion score for aspects of the media content (e.g., upload mean opinion score and playback mean opinion score). The overall mean opinion score may help guide overall quality improvements for a media content delivery system.

Though the examples shown in FIGS. 3A-C, 4A-C and 5A-C show the viewing of media content in a first segment and a second segment, in some implementations the entire media content may be viewed in a single orientation. In some implementations, the media content may be viewed in more than two segments, each segment being viewed in a particular orientation of the computing device. Though the examples shown in FIGS. 3A-C, 4A-C and 5A-C show the viewing of a 30 second media content as a ten second first segment and a twenty second second segment, the media content may be of a longer or shorter time frame, and each segment may be of a longer or shorter time segment than the examples of in FIGS. 3A-C, 4A-C and 5A-C.

As shown in the examples in FIGS. 3A-C, 4A-C and 5A-C, a mean opinion score for media content may change through a viewing session because a played encoding may change, and/or a playback dimension may change. The changes in the mean opinion scores may necessitate a time-weighting of the mean opinion scores in order to determine (calculate, generate) a mean opinion score for the viewing session.

Figure 6:
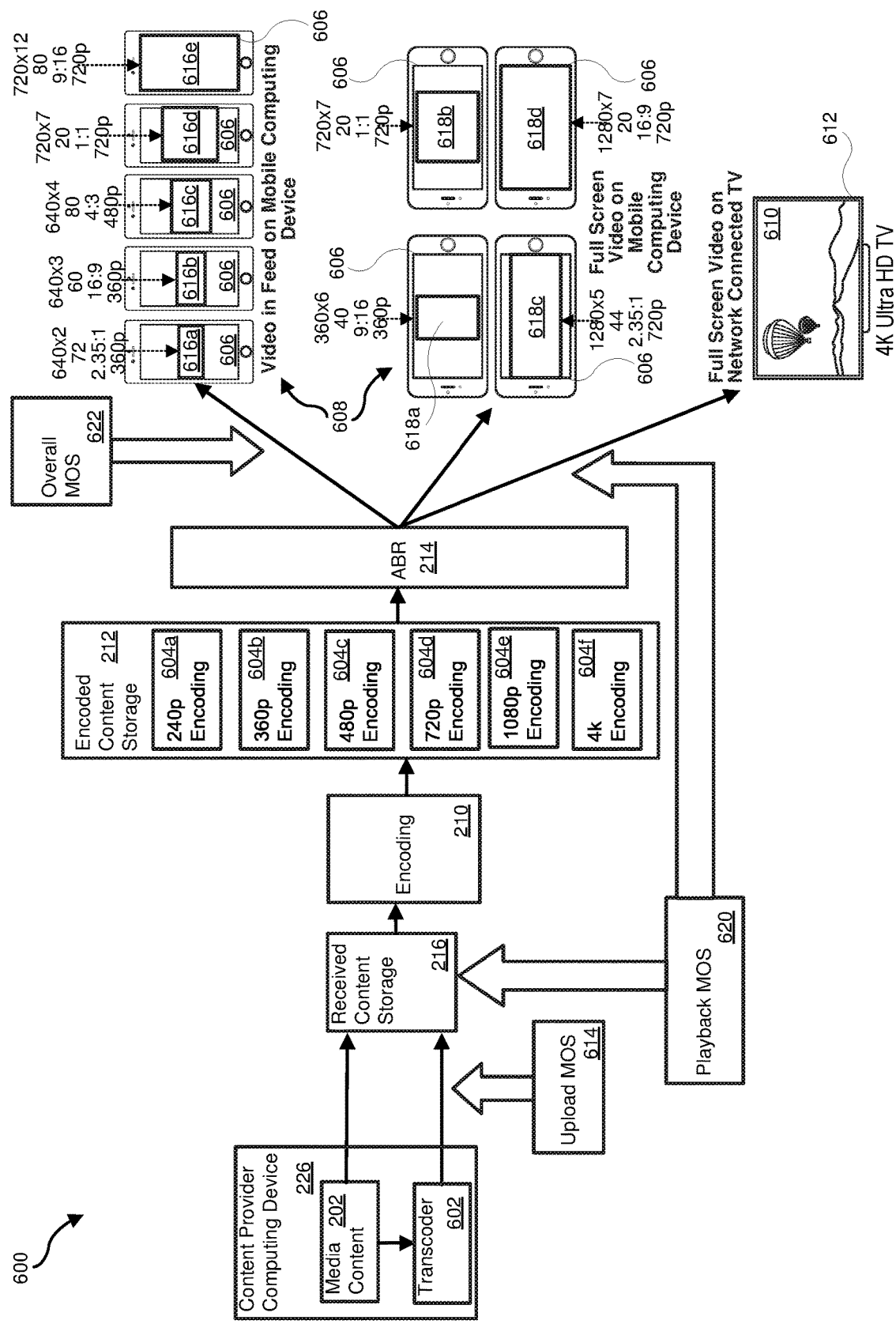
FIG. 6 is a block diagram of an example system showing example measurement building blocks for use in determining an overall quality score for media content.

FIG. 6 is a block diagram of an example system 600 showing example measurement building blocks for use in determining an overall quality score for media content. The system 600 shows an example of media content displayed on various display devices (e.g., a display device 606 of a mobile computing device 608, a display 610 of an HDTV 612) in different viewing modes (e.g., in-feed and full screen), in different orientations (e.g., portrait (vertical) and landscape (horizontal), and at different encodings (e.g., 360p viewport encoding 604b, 720p viewport encoding 604d, 4k encoding 604f).

Referring to FIG. 2, the content provider computing device 226 may provide media content 202 to the received content storage repository 216 for storage in its original format and at its original resolution. In some implementations, a transcoder 602 (or a compression module) may transcode (compress) the media content 202 and provide the transcoded media content to the received content storage repository 216 for storage in a transcoded and/or compressed format. An upload mean opinion score 614 may be associated with the uploaded media content from the content provider computing device 226 that is stored in the received content storage repository 216.

The encoding module 210 may encode received content stored in the received content storage repository 216 into one or more progressive scanned encodings (e.g., encodings 604a-e) and into a 4k resolution encoding 604f. The adaptive bitrate module 214 may interface with the computing device 608 and/or the HDTV 612 to determine which progressive scanned encoding of the media content to provide to the respective playback display devices 206a-e. The determination may be based on one or more criteria associated with the computing device 608, the display device 606 of the computing device 608, the HDTV 612, and the display 610 of the HDTV 612. The criteria may include, but are not limited to, a display resolution of the playback display device (e.g., the display device 606, the display 610), an orientation of the playback display device (e.g., portrait or landscape), a viewing mode of the media content (e.g., in-feed or full screen), a viewing window for the media content, and a communication speed between the computing system 204 providing the media content and the playback computing device receiving the media content.

For example, the adaptive bitrate module 214 may determine a low communication bandwidth between the computing system 204 and a mobile computing device (a playback device) (e.g., the user is in a rural area with limited bandwidth cellular phone service). The adaptive bitrate module 214 may deliver encoded media content to the mobile computing device as a 240p encoding. Though the 240p encoding may provide the media content to the playback device at a lower quality than if the media content were provided to the playback device at a higher encoding (e.g., 720p encoding), the playback of the video on the display device of the mobile computing device may have fewer (or no) stalls, may play instantly, and may require little to any buffering resulting in a better user experience as compared to the delivery of the media content at the higher encoding.

The computing system 204 may deliver the media content to the computing device 608 at various different encodings to different size (different resolution, different aspect ratio) viewing windows in in-feed modes and in full screen modes for viewing in viewing areas 616a-e and viewing areas 618a-d. A playback mean opinion score 620 may be associated with the received media content stored in the received content storage repository 216. The playback mean opinion score 620 may also be associated with the encoding of the received media content provided to a viewing device. As described herein, an overall mean opinion score 622 may be determined for the delivered media content.

The system 600 shows, for example, video in feed on a mobile computing device 608, full screen video on the mobile computing device 608, and full screen video on the HDTV 612 connected to a communication network (e.g., the internet via a WiFi connection) are examples of three different types of viewing experiences for the same media content. For example, in some implementations, video quality artifacts may be more easily perceived in a full screen viewing experience as compared to an in feed viewing experience. In some implementations, the perceiving of the video quality artifacts may be further based on the upload quality of the media content and/or the encoding quality of the media content.

In some implementations, a playback mean opinion score may be based on scaled structural similarity (SSIM) between uploaded original media content (received media content, media content provided by a content provider computing device and received by a computing system) and encoded media content as encoded by the computing system. For example, referring to FIG. 2, a playback mean opinion score may be based on a SSIM between the media content provided by the content provider computing device 226 and the encoded media content as encoded by the encoding module 210 for storage in the encoded content storage repository 212. In some implementations, the uploaded original media content and the encoded media content may be scaled to a playback dimension (a playback resolution, e.g., a number of vertical pixels and a number of horizontal pixels) before the computing of a playback mean opinion score.

Figure 7:
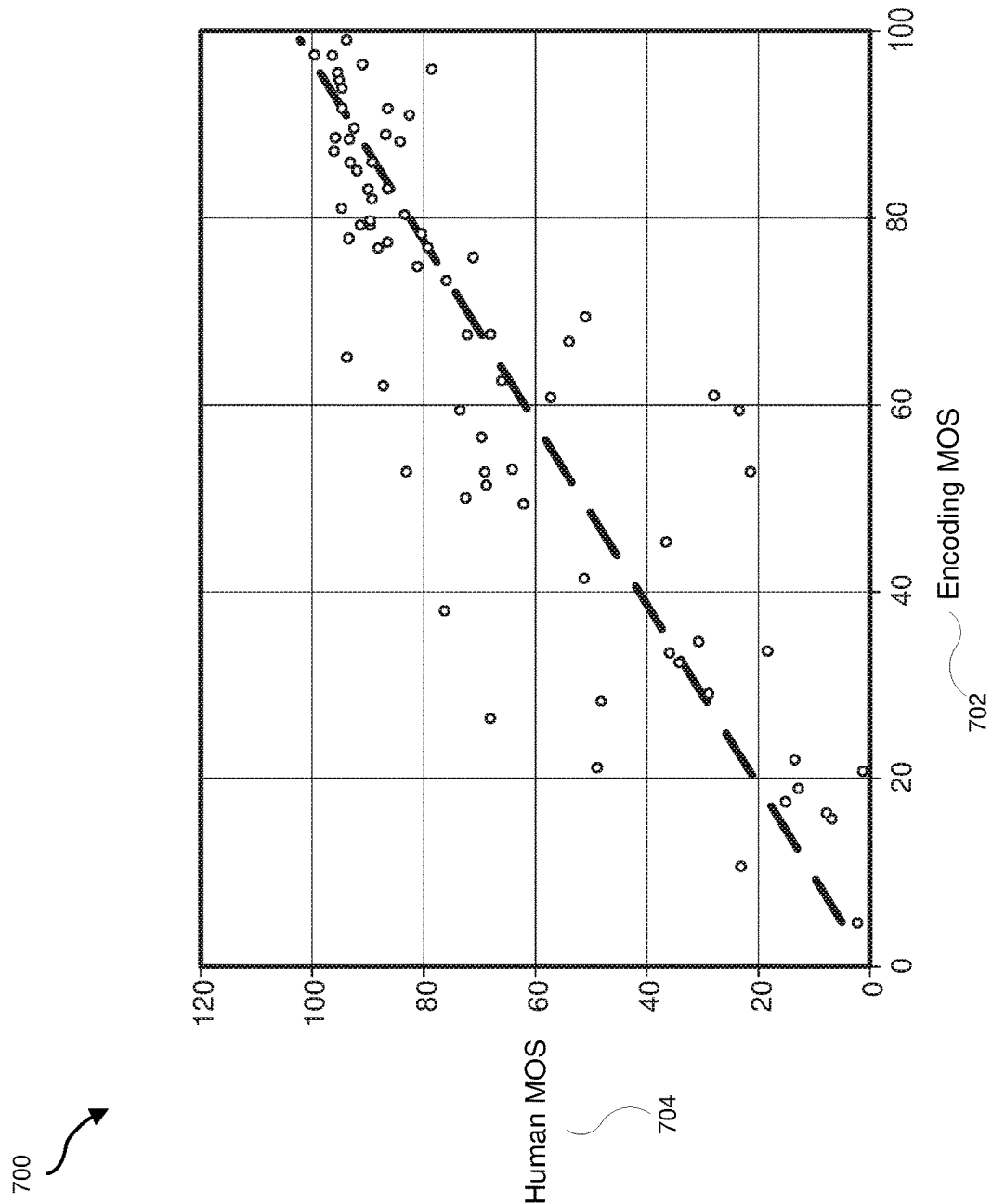
FIG. 7 is a diagram showing an example graph of predicted mean opinion scores based on an encoding mean opinion score verses a mean opinion score based on information provided by a user.

FIG. 7 is a diagram showing an example graph 700 of predicted mean opinion scores based on an encoding mean opinion score (encoding MOS 702) verses a mean opinion score based on information provided by a user (viewer) (Human MOS 704). The example graph 700 shows that a predicted encoding mean opinion score as compared to a mean opinion score based on information provided by a user is reasonable and effective. For example, a Spearman ranking may be equal to 0.873 and a Pearson linearity may be equal to 0.872.

Figure 8:
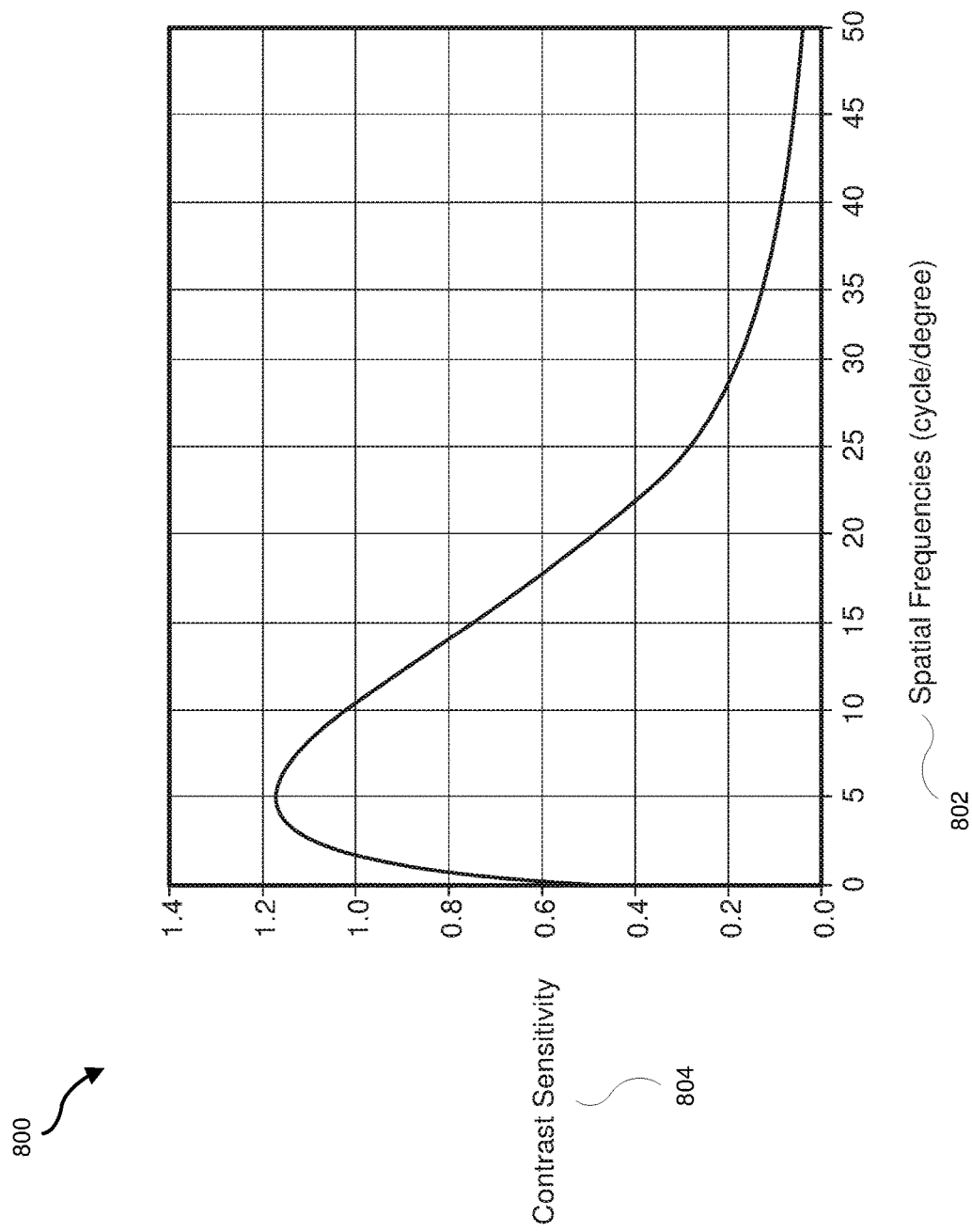
FIG. 8 is a diagram showing an example graph of spatial frequency verses contrast sensitivity for an example visual system for viewing media content.

FIG. 8 is a diagram showing an example graph 800 of spatial frequency 802 (in cycles per degree) verses contrast sensitivity 804 for an example visual system for viewing media content. A sensitivity of a visual system may be dependent on a spatial frequency of a signal. Human visual sensitivity may peak at frequencies around four cycles per degree of visual angle and may decrease along high and low frequency directions. Spatial frequency may be dependent on a number of pixels, a pixel density (pixel per inch (ppi)) and viewing distance of a user from a display device.

In some implementations, a mean opinion score may guide the customizing of media content based on a viewing distance of the user to the display device displaying (playing) the media content. For example, display devices may have different pixel densities (pixels per centimeter, pixels per inch) that may be independent of a size of the display device. In some implementations, a perceived image quality may be dependent on pixel resolution, pixel density and a viewing distance of a user from the display device. For example, a user viewing 360p encoded media content on a low ppi computing device may have a different experience as compared to viewing the 360p encoded media content on a high ppi computing device.

In some implementations, it may be beneficial to have a mean opinion score configurable based on a multi-scale weighting to accommodate for display device number of pixels, pixel density (ppi), and viewing distance of a user from a display device. For example, a resolution of received media content may vary. In addition, or in the alternative, the media content may be viewed on display devices of varying pixel densities and may be viewed at different viewing distances. All of these factors may contribute to the viewing experience of the user.

In some implementations, referring to FIG. 2 and FIG. 6, the encoding module 210 may compute a full reference metric at each encoding resolution (e.g., 240p, 360p, 480p, 720p, and 1080p). A scaled structural similarity (SSIM) and/or a peak signal-to-noise ratio (PSNR) may be estimated for the media content at a fixed resolution and stored as a full reference metric with the encoded media content stored in the encoded content storage repository 212. At the time of delivery of the encoded media content to a computing device for display on a display device of the computing device, the adaptive bitrate module 214 may determine a playback resolution, pixel density, and established viewing distance for the display device of the computing device. Because spatial frequency may be a function of a display device pixel density and a viewing distance of a user to the display device, a weighting may be determined for each encoding resolution based on a contrast sensitivity at a corresponding spatial frequency (examples of which are shown in FIG. 7).

For example, a low weighting may be applied to a 1080p encoding provided to a retina display device because a retina display device may be considered to have a high spatial frequency for relatively low contrast sensitivity. In another example, a weighting higher than the weighting applied to the 1080p encoding provided to the retina display device may be applied to the 1080p encoding when provided to an HDTV.

Figure 9:
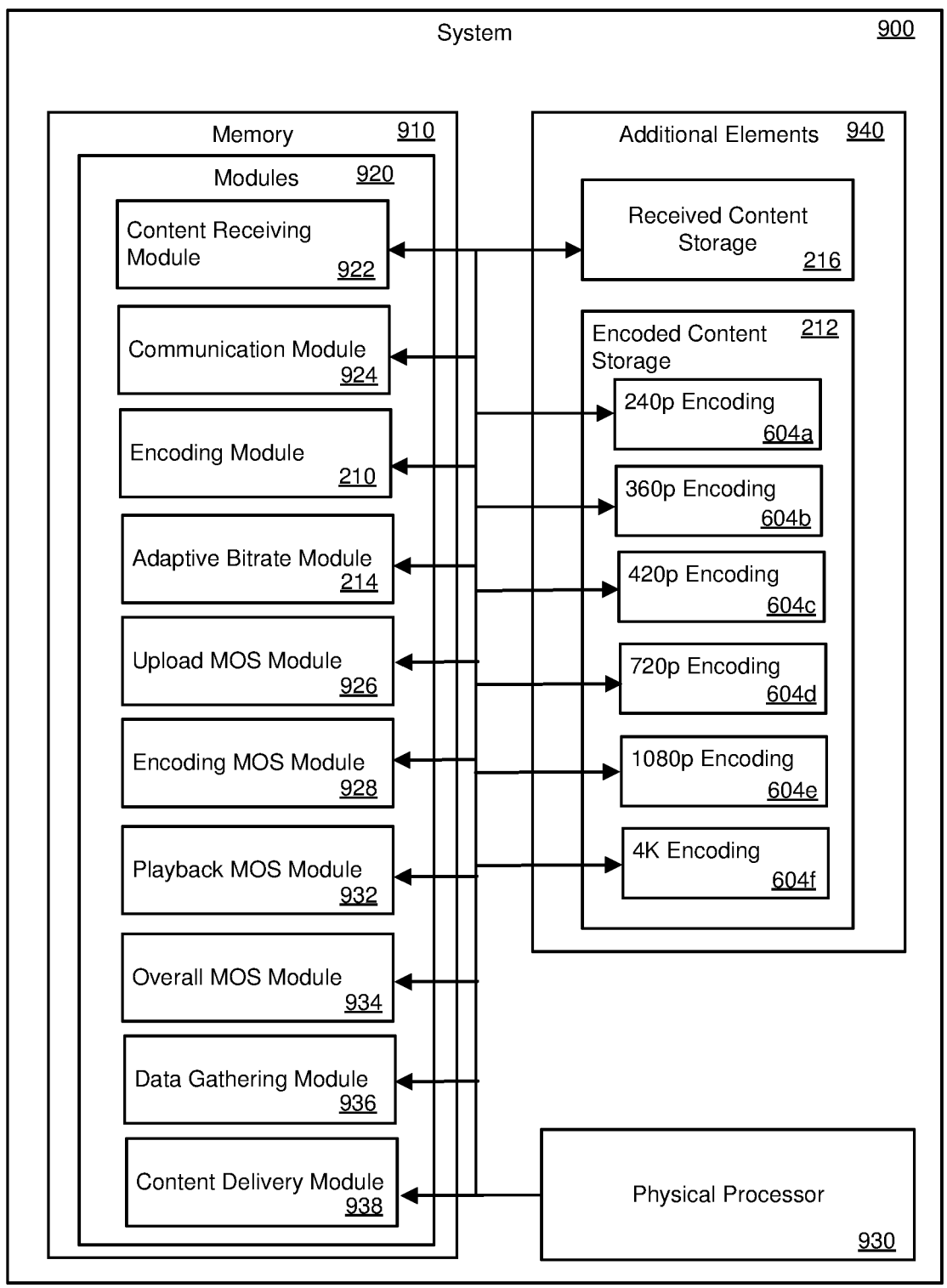
FIG. 9 is a block diagram of an example system that includes modules for use in determining mean opinion scores for media content.

FIG. 9 is a block diagram of an example system 900 that includes modules for use in determining mean opinion scores for media content. Referring to FIG. 2 and FIG. 6, modules 920 may include the encoding module 210 and the adaptive bitrate module 214. The modules 920 may include a content receiving module 922, a communication module 924, a upload mean opinion score module 926, an encoding mean opinion score module 928, a playback mean opinion score module 932, an overall mean opinion score module 934, a data gathering module 936, and a content delivery module 938.

Although illustrated as separate elements, one or more of modules 920 in FIG. 9 may represent portions of a single module or application.

Referring to FIG. 2 and FIG. 6, the content receiving module 922 may receive media content 202 (which may be compressed or transcoded) from the content provider computing device 226. The content receiving module 922 may store the received media content 202 in the received content storage repository 216. The communication module 924 may facilitate communications between the system 900 and a content provider computing device (e.g., the content provider computing device 226). The communication module 924 may determine and/or provide a bandwidth of a communication connection between the system 900 and a computing device to the adaptive bitrate module 214 for use in determining an encoding and transmission bitrate for delivery of the encoded media content to the computing device. The communication module 924 may determine and/or provide a bandwidth of a communication connection between the system 900 and a computing device to the content delivery module 938. The content delivery module 938 may provide (transmit) the selected encoding of the media content to the computing device.

Referring to FIGS. 3A-C, the upload mean opinion score module 926 may determine (calculate) an upload mean opinion score as described herein. Referring to FIGS. 4A-C, the playback mean opinion score module 932 may determine (calculate) a playback mean opinion score as described herein. Referring to FIGS. 5A-C, the encoding mean opinion score module 928 may determine (calculate) an encoding mean opinion score as described herein. The overall mean opinion score module 934 may determine (calculate) an overall mean opinion score as described herein.

The data gathering module 936 may gather information and data for use in determining mean opinion scores. For example, referring to FIGS. 3A, 4A, and 5A, information and data associated with a perceived quality of viewed media content associated with delivered resolutions and delivered number of bits per second may be used to determine (calculate) mean opinion scores. For example, a computing system may deliver a video to a computing device of a user at a particular video resolution and transmission speed. The user may provide a score for a perceived quality of the delivered video which may later be used by the computing system to determine (generate) a mean opinion score for a video delivered at the particular video resolution and transmission speed. The generated mean opinion scores may be stored in a table (e.g., the table 302, the table 402, the table 502) for use in predicting mean opinion scores for subsequent media content for delivery to a computing device as disclosed herein.

In certain embodiments, one or more of modules 920 in FIG. 9 may represent one or more software applications or programs that, when executed by a computing device, may cause the computing device to perform one or more tasks. As illustrated in FIG. 9, example system 900 may also include one or more memory devices, such as memory 910. Memory 910 generally represents any type or form of volatile or non-volatile storage device or medium capable of storing data and/or computer-readable instructions. In one example, memory 910 may store, load, and/or maintain one or more of modules DD20. Examples of memory 910 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 9, example system 900 may also include one or more physical processors, such as physical processor 930. Physical processor 930 generally represents any type or form of hardware-implemented processing unit capable of interpreting and/or executing computer-readable instructions. In one example, physical processor 930 may access and/or modify one or more of modules 920 stored in memory 910. Additionally, or alternatively, physical processor 930 may execute one or more of modules 920. Examples of physical processor DD30 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 9, example system 900 may also include one or more additional elements 940. The additional elements 940 generally represent any type or form of hardware and/or software. In one example, physical processor 930 may access and/or modify one or more of the additional elements 940.

The additional elements 940 may be included in one or more repositories. The one or more repositories may be memory (e.g., the memory 910). The one or more repositories may be databases. In some implementations, the additional elements 940 may be included (part of) the system 900. In some implementations, the additional elements 940 may be external to the system 900 and accessible by the system 900. Referring to FIG. 2 and FIG. 6, the additional elements 940 may include the received content storage repository 216 and the encoded content storage repository 212. The encoded content storage repository 212 may store encodings 604a-f.

Figure 10:
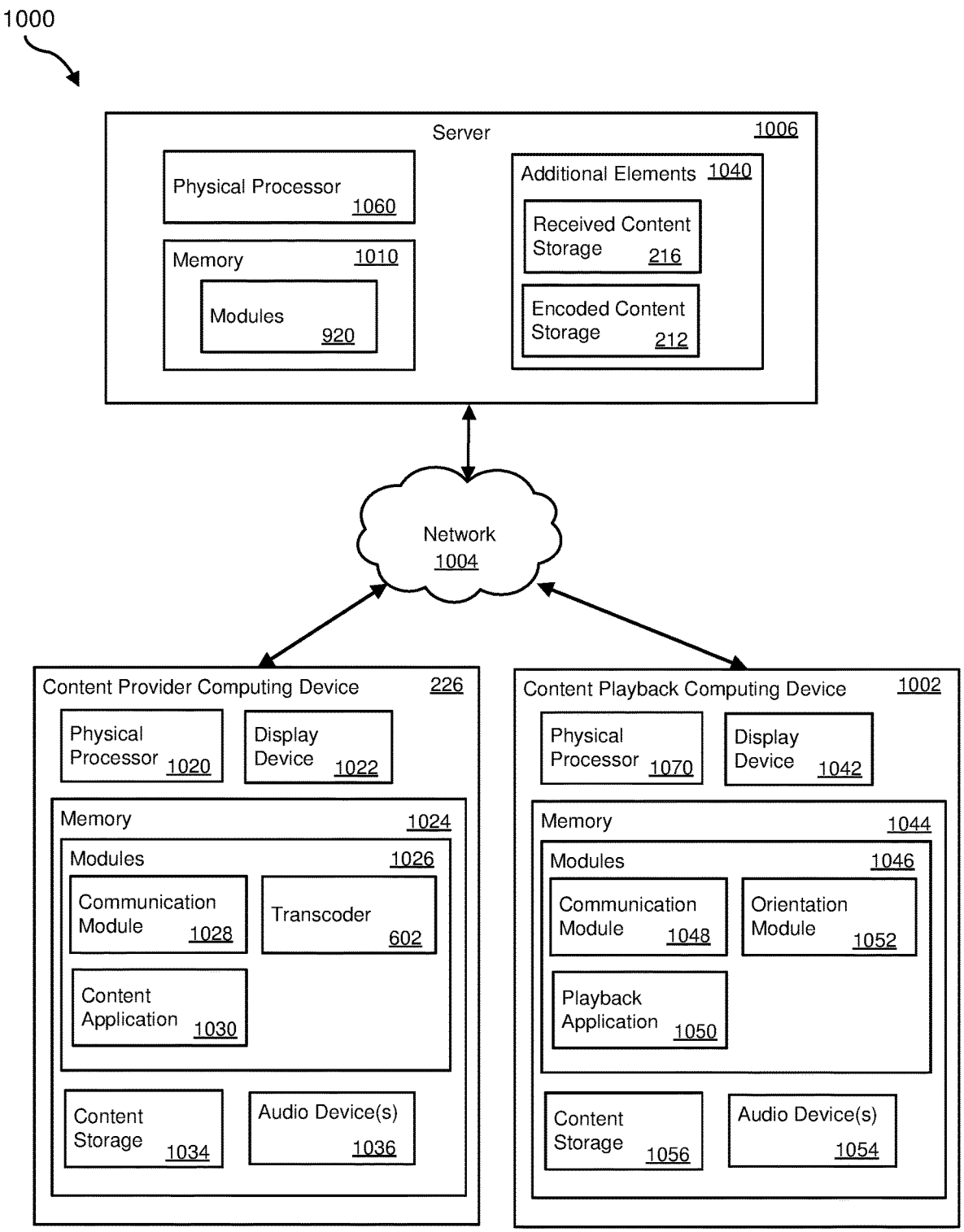
FIG. 10 illustrates an exemplary network environment in which aspects of the present disclosure may be implemented.

FIG. 10 illustrates an exemplary network environment 1000 in which aspects of the present disclosure may be implemented. The network environment 1000 may include one or more computing devices (e.g., the content provider computing device 226, a content playback computing device 1002), a network 1004, and a server 1006. The content playback computing device 1002 may represent any one of the playback computing devices 208a-e. The content playback computing device 1002 may represent any one of the computing device 312, the computing device 412, the computing device 512, the computing device 608, and the HDTV 612.

In one example, the server 1006 may host a system for receiving media content, determining (calculating) mean opinion scores for the media content, and delivering an encoding of the media content to a playback computing device. For example, the server 1006 may host all or part of the system 900 as shown in FIG. 9. In this example, the server 1006 may include a physical processor 1060 that may be one or more general-purpose processors that execute software instructions. The server 1006 may include a data storage subsystem that includes a memory 1010 which may store software instructions, along with data (e.g., input and/or output data) processed by execution of those instructions. Referring to FIG. 9, the memory 1010 may include the modules 920.

The server 1006 may include additional elements 1040. Referring FIG. 9, the additional elements 1040 may include all or part of the additional elements 940. In some implementations, all or part of the additional elements 1040 may be external to the server 1006 and the content playback computing device 1002 and may be accessible by the server 1006 either directly (a direct connection) or by way of the network 1004.

The content provider computing device 226 may represent a client device or a user device, such a desktop computer, laptop computer, tablet device, smartphone, or other computing device. The content provider computing device 226 may include a physical processor (e.g., physical processor 1020), which may represent a single processor or multiple processors, and one or more memory devices (e.g., memory 1024), which may store instructions (e.g., software applications) and/or data in one or more modules 1026. The modules 1026 may store software instructions, along with data (e.g., input and/or output data) processed by execution of those instructions.

The content provider computing device 226 may be (represent) a computing device of a user. The content provider computing device 226 may include content storage 1034 for storage of media content obtained, created, and/or generated by the user. In some implementations, media content stored in the content storage 1034 may be accessed by a content application 1030. The content application 1030 may include hardware and/or software for displaying the media content on a display device 1022 included in the content provider computing device 226. In addition, or in the alternative, the content application 1030 may include hardware and/or software for providing media content to the server 1006 by way of the network 1004. A communication module 1028 may include hardware and/or software for establishing a connection to the server 1006 by way of the network 1004, for example, by interfacing with the communication module 924 included in the modules 920. In some implementations, the content application 1030 may include hardware and/or software for providing media content to a transcoder 602. The transcoder 602 may include hardware and/or software for transcoding and/or compressing the media content for subsequent delivery to the server 1006. In some implementations, the transcoded and/or compressed media content may be stored in the content storage 1034 for later delivery to the server 1006. One or more audio device(s) 1036 may include hardware and/or software for playing audio media content (e.g., one or more speakers) and/or for recording audio media content (e.g., one or more microphones).

The content provider computing device 226 may be communicatively coupled to the server 1006 through the network 1004. The network 1004 may be any communication network, such as the Internet, a Wide Area Network (WAN), or a Local Area Network (LAN), and may include various types of communication protocols and physical connections.

The content playback computing device 1002 may represent a client device or a user device, such a desktop computer, laptop computer, tablet device, smartphone, or other computing device. In addition, or in the alternative, the content playback computing device 1002 may represent a smart TV, an HDTV, a digital display device, an electronic visual display, or any type of computing device or display device that may communicate with the server 1006 by way of the network 1004. The content playback computing device 1002 may include a physical processor (e.g., physical processor 1070), which may represent a single processor or multiple processors, and one or more memory devices (e.g., memory 1044), which may store instructions (e.g., software applications) and/or data in one or more modules 1046. The modules 1046 may store software instructions, along with data (e.g., input and/or output data) processed by execution of those instructions.

The content playback computing device 1002 may be (represent) a computing device of a user. The content playback computing device 1002 may receive encoded media content from the server 1006 by way of the network 1004 for display on a display device 1042. In some implementations, the content playback computing device 1002 may store the received encoded media content in a content storage repository 1056 for later playing (displaying) on a display device 1042. In some implementations, the received media content may be played (displayed) on the display device 1042 as it is received from the server 1006 (e.g., the received media content is streamed to the display device 1042). A playback application 1050 may include hardware and/or software for displaying (playing) the received media content on the display device 1042 for viewing by the user.

In some implementations, the playback application 1050 may include hardware and/or software for interpreting transcoded and/or compress media content when providing the media content for displaying (playing) on the display device 1042. One or more audio device(s) 1054 may include hardware and/or software for playing audio media content (e.g., one or more speakers) and/or for recording audio media content (e.g., one or more microphones). An orientation module 1052 may include hardware and/or software for determining an orientation (e.g., vertical, horizontal, portrait, landscape) of the content playback computing device 1002. For example, the orientation module 1052 may include one or more sensors that may include, but are not limited to, accelerometers, gyroscopes, magnetometers, and other suitable types of sensors that may be used to detect and/or determine an orientation of the content playback computing device 1002.

A communication module 1048 may include hardware and/or software for establishing a connection to the server 1006 by way of the network 1004, for example, by interfacing with the communication module 924 included in the modules 920. The content playback computing device 1002 may be communicatively coupled to server 1006 through the network 1004. The network 1004 may be any communication network, such as the Internet, a Wide Area Network (WAN), or a Local Area Network (LAN), and may include various types of communication protocols and physical connections.

Figure 11:
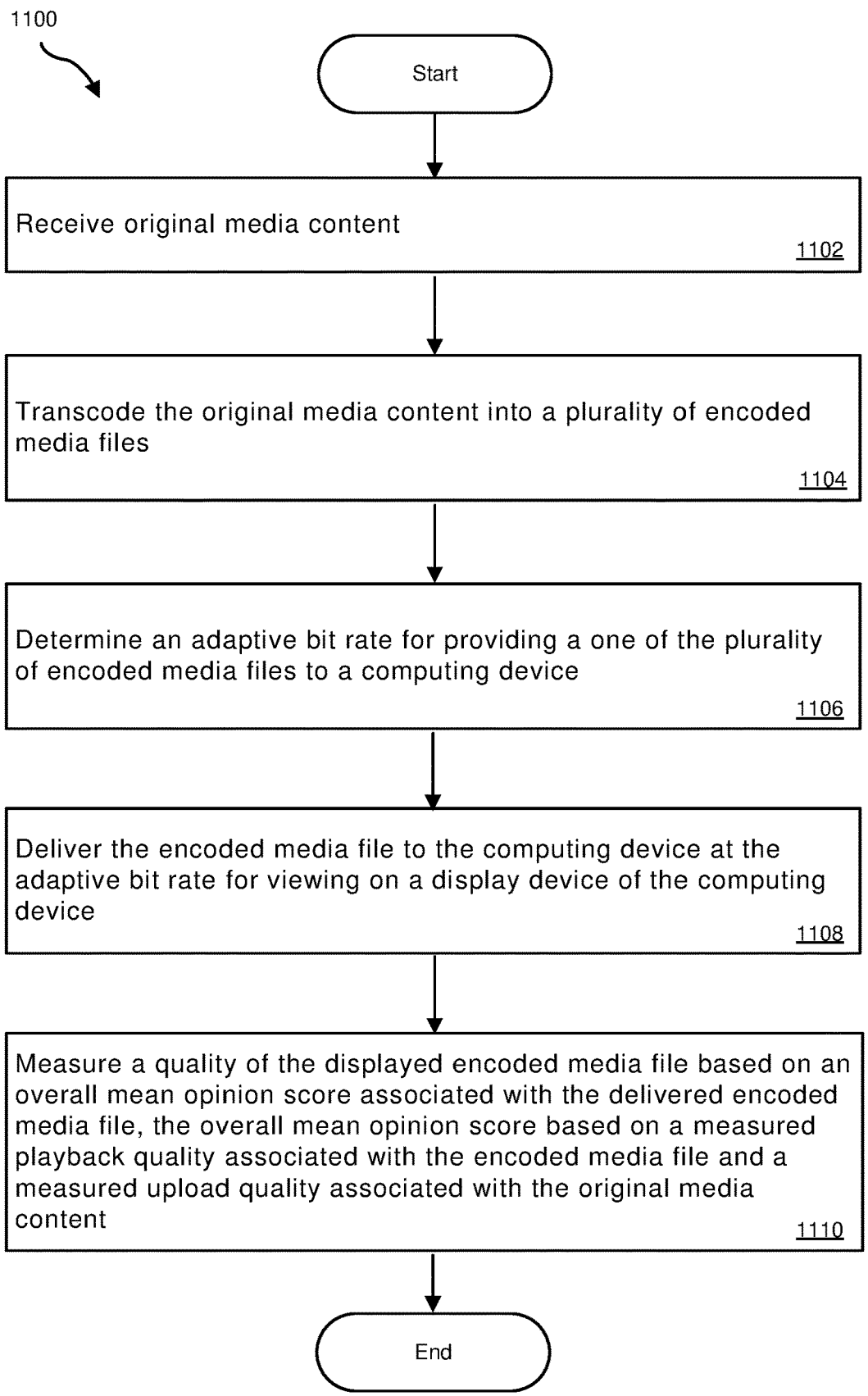
FIG. 11 is a flow diagram of an exemplary computer-implemented method for measuring a quality of displayed media content using mean opinion scores.

FIG. 11 is a flow diagram of an exemplary computer-implemented method 1100 for measuring a quality of displayed media content using mean opinion scores. The steps shown in FIG. 11 may be performed by any suitable computer-executable code and/or computing system, including the system(s) illustrated in FIGS. 2, 6, 9, and 10. In one example, each of the steps shown in FIG. 11 may represent an algorithm whose structure includes and/or is represented by multiple sub-steps, examples of which will be provided in greater detail below.

As illustrated in FIG. 11, at step 1102 one or more of the systems described herein may receive original media content. For example, content receiving module 922 may receive original media content from the content provider computing device 226.

The systems described herein may perform step 1102 in a variety of ways. In one example, the content provider computing device 226 may provide original media content to the computing system 204. In some implementations, the received original media content may be transcoded and/or compressed by the content provider computing device 226 before delivery (transmitting) of the original media content to the computing system 204.

As illustrated in FIG. 11, at step 1104 one or more of the systems described herein may transcode the original media content into a plurality of encoded media files. For example, the encoding module 210 may transcode (encode) the received original media content into one or more progressive scanned encodings (e.g., encodings 604*a*-*e*) and into a 4k resolution encoding 604*f*.

The systems described herein may perform step 1104 in a variety of ways. In one example, the encoding module 210 may transcode (encode) the received original media content into one or more progressive scanned encodings (e.g., encodings 604*a*-*e*) and into a 4k resolution encoding 604*f* for storage in the encoded content storage.

As illustrated in FIG. 11, at step 1106 one or more of the systems described herein may determine an adaptive bit rate for providing a one of the plurality of encoded media files to a computing device. For example, the adaptive bitrate module 214 may identify an encoded media file and may determine an adaptive bitrate for delivery of the encoded media file to a computing device.

The systems described herein may perform step 1106 in a variety of ways. In one example, the adaptive bitrate module 214 may identify an encoded media file for delivery to the content playback computing device 1002 and an adaptive bitrate for delivery of the encoded media file based on one or more criteria associated with the content playback computing device 1002 that may include, but are not limited to, a display resolution of the display device 1042, an orientation of the content playback computing device 1002, a viewing mode of the media content, and a communication speed between the server 1006 and the content playback computing device 1002.

As illustrated in FIG. 11, at step 1108 one or more of the systems described herein may deliver the encoded media file to the computing device at the adaptive bit rate for viewing on a display device of the computing device. For example, the content delivery module 938 may facilitate the delivery of the encoded media file to the content playback computing device 1002 at the adaptive bit rate for viewing on the display device 1042.

The systems described herein may perform step 1108 in a variety of ways. In one example, the server 1006 may transmit (deliver, provide) the encoded media file to the content playback computing device 1002 by way of the network 1004 at the adaptive bitrate for viewing (e.g., streaming to) the display device 1042, which may be facilitated by the playback application 1050.

As illustrated in FIG. 11, at step 1110 one or more of the systems described herein may measure a quality of the displayed encoded media file based on an overall mean opinion score associated with the delivered encoded media file. The overall mean opinion score may be based on a measured playback quality associated with the encoded media file and a measured upload quality associated with the original media content. For example, the playback MOS module 932 may determine (calculate) a playback mean opinion score as described herein. For example, the upload MOS module 926 may determine (calculate) an upload mean opinion score as described herein. The overall MOS module 934 may determine (calculate) an overall mean opinion score as described herein.

The systems described herein may perform step 1110 in a variety of ways. In one example, a measured playback quality associated with the encoded media file may be determined using an associated playback MOS score. A measured upload quality associated with the encoded media file may be determine using an associated upload MOS score. An overall MOS score may be determined (calculated, measured) based on the playback MOS score and the upload MOS score as described herein.

EXAMPLE EMBODIMENTS

Example 1: A computer-implemented method may include receiving original media content, transcoding the original media content into a plurality of encoded media files, determining an adaptive bit rate for providing a one of the plurality of encoded media files to a computing device, delivering the encoded media file to the computing device at the adaptive bit rate for viewing on a display device of the computing device, and measuring a quality of the displayed encoded media file based on an overall mean opinion score associated with the delivered encoded media file, the overall mean opinion score based on a measured playback quality associated with the encoded media file and a measured upload quality associated with the original media content.

Example 2: The computer-implemented method of Example 1, where the original media content may be transcoded media content.

Example 3: The computer-implemented method of any of Examples 1 and 2, where each of the plurality of encoded media files may be of a different encoded resolution.

Example 4: The computer-implemented method of any of Examples 1-3, where determining the adaptive bit rate may be based on one or more of a network interface with the computing device, a resolution of the display device of the computing device, a size of a viewport on the display device of the computing device, and a viewing orientation of the display device of the computing device.

Example 5: The computer-implemented method of any of Examples 1-4, where the encoded media file may include a first segment and a second segment, and where delivering the encoded media file to the computing device at the adaptive bit rate for viewing on the display device of the computing device may include delivering the first segment to the computing device at a first adaptive bit rate, and delivering the second segment to the computing device at a second adaptive bit rate.

Example 6: The computer-implemented method of Example 5, where a first watch time may be associated with the first segment, and where a second watch time may be associated with the second segment.

Example 7: The computer-implemented method of any of Examples 5 and 6, further including calculating a playback mean opinion score as a time weighted average of a first playback mean opinion score associated with the viewing of the first segment and a second playback mean opinion score associated with the viewing of the second segment.

Example 8: The computer-implemented method of any of Examples 5-7, further including calculating an upload mean opinion score as a time weighted average of a first upload mean opinion score associated with the viewing of the first segment and a second upload mean opinion score associated with the viewing of the second segment.

Example 9: The computer-implemented method of any of Examples 5-8, further including calculating an encoding mean opinion score as a time weighted average of a first encoding mean opinion score associated with the viewing of the first segment and a second encoding mean opinion score associated with the viewing of the second segment.

Example 10: The computer-implemented method of any of Example 9, where the first encoding mean opinion score associated with the viewing of the first segment may be based on a bandwidth associated with an encoding of the first segment and a bandwidth associated with the delivery of the first segment, and where the second encoding mean opinion score associated with the viewing of the second segment based on a bandwidth associated with an encoding of the second segment and a bandwidth associated with the delivery of the second segment.

Example 11: The computer-implemented method of any of Examples 6-10, where the first segment may be viewed in a first viewport on the display device of the computing device, and where the second segment may be viewed in a second viewport on the display device of the computing device.

Example 12: The computer-implemented method of Example 11, where a resolution of the first viewport may be different from a resolution of the second viewport.

Example 13: A system may include at least one physical processor, and physical memory including computer-executable instructions that, when executed by the physical processor, cause the physical processor to receive original media content, transcode the original media content into a plurality of encoded media files, determine an adaptive bit rate for providing a one of the plurality of encoded media files to a computing device, deliver the encoded media file to the computing device at the adaptive bit rate for viewing on a display device of the computing device, and measure a quality of the displayed encoded media file based on an overall mean opinion score associated with the delivered encoded media file. The overall mean opinion score may be based on a measured playback quality associated with the encoded media file and a measured upload quality associated with the original media content.

Example 14: The system of Example 13, where the original media content may be transcoded media content.

Example 15: The system of any of Examples 13 and 14, where each of the plurality of encoded media files may be of a different encoded resolution.

Example 16: The system of any of Examples 13-15, where determining the adaptive bit rate may be based on one or more of a network interface with the computing device, a resolution of the display device of the computing device, a size of a viewport on the display device of the computing device, and a viewing orientation of the display device of the computing device.

Example 17: The system of any of Examples 13-16, where the encoded media file may include a first segment and a second segment, and where delivering the encoded media file to the computing device at the adaptive bit rate for viewing on the display device of the computing device may include delivering the first segment to the computing device at a first adaptive bit rate, and delivering the second segment to the computing device at a second adaptive bit rate.

Example 18: A non-transitory computer-readable medium that may include one or more computer-executable instructions that, when executed by at least one processor of a computing system, cause the computing system to receive original media content, transcode the original media content into a plurality of encoded media files, determine an adaptive bit rate for providing a one of the plurality of encoded media files to a computing device, deliver the encoded media file to the computing device at the adaptive bit rate for viewing on a display device of the computing device, and measure a quality of the displayed encoded media file based on an overall mean opinion score associated with the delivered encoded media file. The overall mean opinion score may be based on a measured playback quality associated with the encoded media file and a measured upload quality associated with the original media content.

Example 19: The non-transitory computer-readable medium of Example 18, where the original media content may be transcoded media content.

Example 20: The non-transitory computer-readable medium of any of Examples 18 and 19, where each of the plurality of encoded media files may be of a different encoded resolution.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 1200 in FIG. 12. Other artificial-reality systems may include a NED that also provides visibility into the real world (e.g., augmented-reality system 1300 in FIG. 13) or that visually immerses a user in an artificial reality (e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
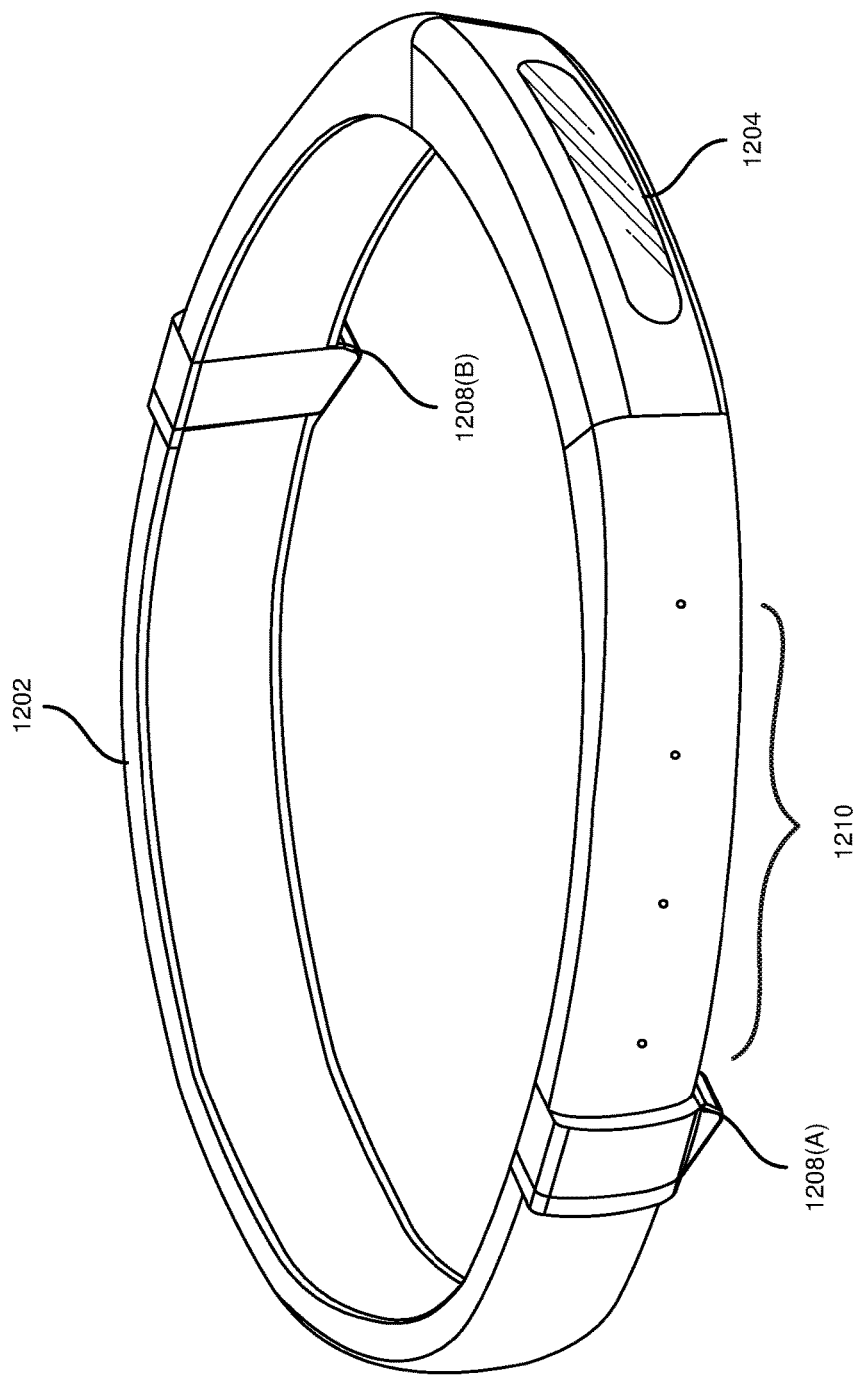
FIG. 12 is an illustration of an exemplary artificial-reality headband that may be used in connection with embodiments of this disclosure.

Turning to FIG. 12, augmented-reality system 1200 generally represents a wearable device dimensioned to fit about a body part (e.g., a head) of a user. As shown in FIG. 12, system 1200 may include a frame 1202 and a camera assembly 1204 that is coupled to frame 1202 and configured to gather information about a local environment by observing the local environment. Augmented-reality system 1200 may also include one or more audio devices, such as output audio transducers 1208(A) and 1208(B) and input audio transducers 1210. Output audio transducers 1208(A) and 1208(B) may provide audio feedback and/or content to a user, and input audio transducers 1210 may capture audio in a user's environment.

As shown, augmented-reality system 1200 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1200 may not include a NED, augmented-reality system 1200 may include other types of screens or visual feedback devices (e.g., a display screen integrated into a side of frame 1202).

Figure 13:
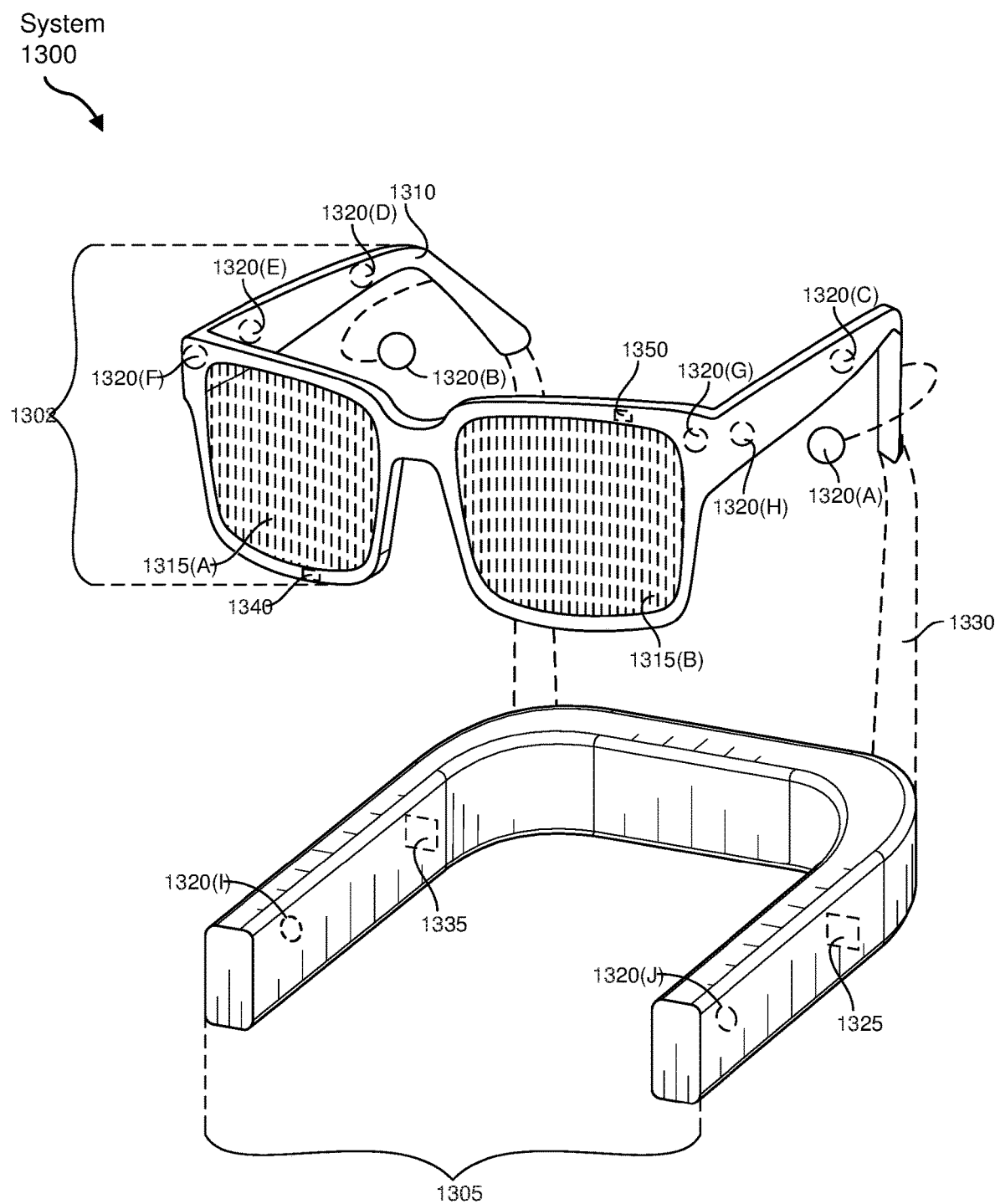
FIG. 13 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent a position sensor, an inertial measurement unit (IMU), a depth camera assembly, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

Augmented-reality system 1300 may also include a microphone array with a plurality of acoustic transducers 1320(A)-1320(J), referred to collectively as acoustic transducers 1320. Acoustic transducers 1320 may be transducers that detect air pressure variations induced by sound waves. Each acoustic transducer 1320 may be configured to detect sound and convert the detected sound into an electronic format (e.g., an analog or digital format). The microphone array in FIG. 2 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(1) and 1320(J), which may be positioned on a corresponding neckband 1305.

In some embodiments, one or more of acoustic transducers 1320(A)-(F) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments, acoustic transducers 1320(A) and 1320(B) may be connected to augmented-reality system 1300 via a wireless connection (e.g., a Bluetooth connection). In still other embodiments, acoustic transducers 1320(A) and 1320(B) may not be used at all in conjunction with augmented-reality system 1300.

Acoustic transducers 1320 on frame 1310 may be positioned along the length of the temples, across the bridge, above or below display devices 1315(A) and 1315(B), or some combination thereof. Acoustic transducers 1320 may be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers and other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1200, augmented-reality system 1300, and/or virtual-reality system 1400 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 12 and 14, output audio transducers 1208(A), 1208(B), 1406(A), and 1406(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1210 may include condenser microphones, dynamic microphones, ribbon microphones, and/or any other type or form of input transducer. In some embodiments, a single transducer may be used for both audio input and audio output.

Figure 14:
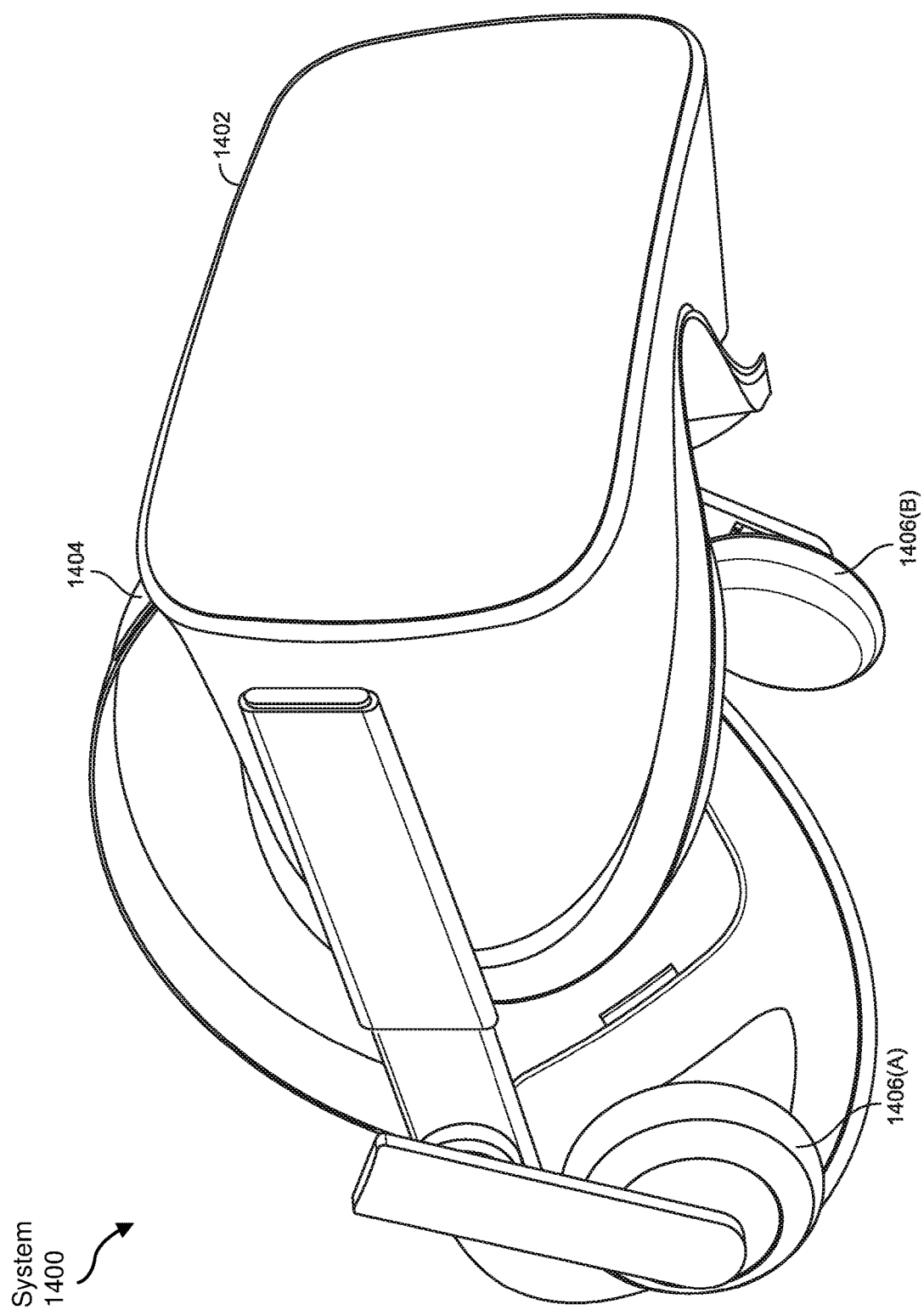
FIG. 14 is an illustration of an exemplary virtual-reality headset that may be used in connection with embodiments of this disclosure.

While not shown in FIGS. 12-14, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving original media content;
   transcoding the original media content into a plurality of encoded media files;
   determining an adaptive bit rate for providing a one of the plurality of encoded media files to a computing device;
   delivering the encoded media file to the computing device at the adaptive bit rate for viewing on a display device of the computing device; and
   determining a quality of the displayed encoded media file based on an overall mean opinion score associated with the delivered encoded media file, the overall mean opinion score determined based on:
      a measured playback mean opinion score based on a determined encode quality of the encoded media file, the determined adaptive bit rate, and a viewport of the display device, and
      a measured upload mean opinion score associated with the original media content; and
   further determining the adaptive bit rate based on the determined overall mean opinion score.

2. The computer-implemented method of claim 1, wherein the original media content is transcoded media content.

3. The computer-implemented method of claim 1, wherein each of the plurality of encoded media files is of a different encoded resolution.

4. The computer-implemented method of claim 1, wherein determining the adaptive bit rate is based on one or more of a network interface with the computing device, a resolution of the display device of the computing device, a size of a viewport on the display device of the computing device, and a viewing orientation of the display device of the computing device.

5. The computer-implemented method of claim 1,
   wherein the encoded media file comprises a first segment and a second segment; and wherein delivering the encoded media file to the computing device at the adaptive bit rate for viewing on the display device of the computing device comprises:
delivering the first segment to the computing device at a first adaptive bit rate; and
delivering the second segment to the computing device at a second adaptive bit rate.

6. The computer-implemented method of claim 5,
wherein a first watch time is associated with the first segment; and
wherein a second watch time is associated with the second segment.

7. The computer-implemented method of claim 6, further comprising calculating a playback mean opinion score as a time weighted average of a first playback mean opinion score associated with the viewing of the first segment and a second playback mean opinion score associated with the viewing of the second segment.

8. The computer-implemented method of claim 6, further comprising calculating an upload mean opinion score as a time weighted average of a first upload mean opinion score associated with the viewing of the first segment and a second upload mean opinion score associated with the viewing of the second segment.

9. The computer-implemented method of claim 6, further comprising calculating an encoding mean opinion score as a time weighted average of a first encoding mean opinion score associated with the viewing of the first segment and a second encoding mean opinion score associated with the viewing of the second segment.

10. The computer-implemented method of claim 9,
wherein the first encoding mean opinion score associated with the viewing of the first segment is based on a bandwidth associated with an encoding of the first segment and a bandwidth associated with the delivery of the first segment; and
wherein the second encoding mean opinion score associated with the viewing of the second segment is based on a bandwidth associated with an encoding of the second segment and a bandwidth associated with the delivery of the second segment.

11. The computer-implemented method of claim 6,
wherein the first segment is viewed in a first viewport on the display device of the computing device; and
wherein the second segment is viewed in a second viewport on the display device of the computing device.

12. The computer-implemented method of claim 11, wherein a resolution of the first viewport is different from a resolution of the second viewport.

13. A system comprising:
at least one physical processor; and
physical memory comprising computer-executable instructions that, when executed by the physical processor, cause the physical processor to:
receive original media content;
transcode the original media content into a plurality of encoded media files;
determine an adaptive bit rate for providing a one of the plurality of encoded media files to a computing device;
deliver the encoded media file to the computing device at the adaptive bit rate for viewing on a display device of the computing device; and
determine a quality of the displayed encoded media file based on an overall mean opinion score associated with the delivered encoded media file, the overall mean opinion score determined based on:
a measured playback mean opinion score based on a determined encode quality of the encoded media file, the determined adaptive bit rate, and a viewport of the display device, and
a measured upload mean opinion score associated with the original media content; and
further determine the adaptive bit rate based on the determined overall mean opinion score.

14. The system of claim 13, wherein the original media content is transcoded media content.

15. The system of claim 13, wherein each of the plurality of encoded media files is of a different encoded resolution.

16. The system of claim 13, wherein determining the adaptive bit rate is based on one or more of a network interface with the computing device, a resolution of the display device of the computing device, a size of a viewport on the display device of the computing device, and a viewing orientation of the display device of the computing device.

17. The system of claim 13,
wherein the encoded media file comprises a first segment and a second segment; and
wherein delivering the encoded media file to the computing device at the adaptive bit rate for viewing on the display device of the computing device comprises:
delivering the first segment to the computing device at a first adaptive bit rate; and
delivering the second segment to the computing device at a second adaptive bit rate.

18. A non-transitory computer-readable medium comprising one or more computer-executable instructions that, when executed by at least one processor of a computing system, cause the computing system to:
receive original media content;
transcode the original media content into a plurality of encoded media files;
determine an adaptive bit rate for providing a one of the plurality of encoded media files to a computing device;
deliver the encoded media file to the computing device at the adaptive bit rate for viewing on a display device of the computing device; and
determine a quality of the displayed encoded media file based on an overall mean opinion score associated with the delivered encoded media file, the overall mean opinion score determined based on:
a measured playback mean opinion score based on a determined encode quality of the encoded media file, the determined adaptive bit rate, and a viewport of the display device, and
a measured upload quality associated with the original media content; and
further determine the adaptive bit rate based on the determined overall mean opinion score.

19. The non-transitory computer-readable medium of claim 18, wherein the original media content is transcoded media content.

20. The non-transitory computer-readable medium of claim 18, wherein each of the plurality of encoded media files is of a different encoded resolution.

* * * * *